United States Patent
Mizutani

(10) Patent No.: US 11,677,117 B2
(45) Date of Patent: Jun. 13, 2023

(54) BATTERY MODULE AND BATTERY MODULE MANUFACTURING METHOD

(71) Applicant: TOYOTA JIDOSHA KABUSHIKI KAISHA, Toyota (JP)

(72) Inventor: Akifumi Mizutani, Ichinomiya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 30 days.

(21) Appl. No.: 17/151,728

(22) Filed: Jan. 19, 2021

(65) Prior Publication Data

US 2021/0273287 A1 Sep. 2, 2021

(30) Foreign Application Priority Data

Mar. 2, 2020 (JP) .............................. JP2020-035124

(51) Int. Cl.
*H01M 50/289* (2021.01)
*H01M 50/244* (2021.01)
*H01M 50/209* (2021.01)
*H01M 10/04* (2006.01)

(52) U.S. Cl.
CPC ..... *H01M 50/289* (2021.01); *H01M 10/0481* (2013.01); *H01M 50/209* (2021.01); *H01M 50/244* (2021.01)

(58) Field of Classification Search
CPC ........... H01M 50/20–211; H01M 50/233–244; H01M 50/249–253; H01M 50/262–264; H01M 50/269; H01M 50/289–293; H01M 10/02–0418; H01M 10/0481; H01M 10/058–0587
See application file for complete search history.

(56) References Cited

U.S. PATENT DOCUMENTS

| | | | |
|---|---|---|---|
| 2009/0239137 A1 | 9/2009 | Kakuchi | |
| 2016/0093849 A1* | 3/2016 | DeKeuster | H01M 50/20 |
| | | | 429/61 |
| 2018/0358587 A1 | 12/2018 | Tononishi | |
| 2021/0083245 A1* | 3/2021 | Yamazaki | H01M 50/291 |

(Continued)

FOREIGN PATENT DOCUMENTS

| | | |
|---|---|---|
| CN | 107210394 A | 9/2017 |
| JP | 2012-243689 A | 12/2012 |

(Continued)

OTHER PUBLICATIONS

Machine translation of Yamanaka, JP 2018-049803. Originally published Mar. 29, 2018 (Year: 2018).*

(Continued)

*Primary Examiner* — Jonathan Crepeau
*Assistant Examiner* — Jacob Buchanan
(74) *Attorney, Agent, or Firm* — Oblon, McClelland, Maier & Neustadt, L.L.P.

(57) ABSTRACT

A battery module includes a box-shaped housing case that is open at an upper side and that does not include a hole formed in a side wall, a battery stack that includes plural battery cells stacked along a horizontal direction and that is housed inside the housing case, and a shim that is disposed between the battery stack and the housing case so as to press the battery stack along the stacking direction of the battery cells in a state in which the battery stack is housed inside the housing case.

2 Claims, 21 Drawing Sheets

(56) References Cited

U.S. PATENT DOCUMENTS

2021/0273286 A1   9/2021  Yamazaki
2021/0273287 A1 * 9/2021  Mizutani ............. H01M 50/289

FOREIGN PATENT DOCUMENTS

| JP | 2017-188282 A |   | 10/2017 | | |
| JP | 2018-32519 A |   | 3/2018 | | |
| JP | 2018-049803 A |   | 3/2018 | | |
| JP | 2018049803 A | * | 3/2018 | ............. | Y02E 60/10 |
| JP | 2018-185949 A |   | 11/2018 | | |
| KR | 20190010229 A | * | 1/2019 | ........ | H01M 10/0481 |
| WO | 2019/151037 A1 |   | 8/2019 | | |

OTHER PUBLICATIONS

Machine translation of Kwon et al., KR 10-2019-0010229. Originally published Jan. 30, 2019. (Year: 2019).*
U.S. Office Action issued in U.S. Appl. No. 17/019,046, filed Apr. 14, 2022.
U.S. Notice of Allowance issued in U.S. Appl. No. 17/019,046, filed Aug. 8, 2022.
U.S. Corrected Notice of Allowability issued in U.S. Appl. No. 17/019,046 filed Aug. 24, 2022.
U.S. Office Action issued in U.S. Appl. No. 17/151,717 dated Apr. 14, 2023.

* cited by examiner

BATTERY MODULE AND BATTERY MODULE MANUFACTURING METHOD

CROSS-REFERENCE TO RELATED APPLICATION

This application claims priority under 35 USC 119 from Japanese Patent Application No. 2020-035124 filed on Mar. 2, 2020, the disclosure of which is incorporated by reference herein in its entirety.

BACKGROUND

Technical Field

The present disclosure relates to a battery module and a battery module manufacturing method.

Japanese Patent Application Laid-Open (JP-A) No. 2018-032519 discloses technology relating to a battery module including a box shaped module case that is open at an upper portion, and a battery stack that is housed inside the module case. A pair of end plates are provided at two length direction end portions of the battery stack.

In this related art, a mutually opposing stack-side opposing face and case-side opposing face are each inclined at substantially the same angle as the other between the respective end plates and the module case.

The battery stack is pushed into a housing space inside the module case, thereby enabling a predetermined load (pressing force) to be applied to the battery stack along a length direction of the battery stack.

SUMMARY OF INVENTION

Technical Problem

Such a module case (hereafter referred to as "housing case") is generally formed of metal, and little variation arises in the length direction dimension of the housing case. In contrast thereto, the battery stack is partially formed of resin, and the length direction dimension of the battery stack varies more than that of the housing case.

In the above related art, restraining load (pressing force) is applied to the battery stack as a result of press-fitting the battery stack into the housing case. Thus, variation in the pressing force on the battery stack might occur as a result of dimensional variation in the battery stack due to manufacturing tolerance.

In consideration of the above circumstances, an object of the present disclosure is to obtain a battery module and a battery module manufacturing method capable of suppressing variation in the pressing force with which a battery stack is pressed in a simple manner, even in cases in which variation is present in a housing case and the battery stack as a result of manufacturing tolerances.

Solution to Problem

A battery module of a first aspect includes a box-shaped housing case that is open at an upper side and that does not include a hole formed in a side wall, a battery stack that includes plural battery cells stacked along a horizontal direction and that is housed inside the housing case, and a shim that is disposed between the battery stack and the housing case so as to press the battery stack along a stacking direction of the battery cells in a state in which the battery stack is housed inside the housing case.

The battery module of the first aspect includes the housing case, the battery stack, and the shim.

The housing case has a box-shape, is open at the upper side, and is not formed with a hole. The battery stack includes the plural battery cells stacked along the horizontal direction, and is housed inside the housing case. In a state in which the battery stack is housed inside the housing case, the shim is disposed between the battery stack and the housing case, such that the shim maintains a state in which the battery stack is pressed along the stacking direction of the battery cells.

Namely, in the present disclosure, dimensional variation of the battery stack in the battery cell stacking direction can be absorbed by changing the plate thickness of the shim.

Accordingly, in the present disclosure, providing the shim between the battery stack and the housing case enables variation in the pressing force with which the battery stack is pressed to be suppressed even in cases in which manufacturing tolerances are present in the housing case and the battery stack.

Moreover, since the housing case of the present disclosure is not formed with a hole, a waterproofing effect can be obtained for the battery stack. In the case of a comparative example in which a hole is formed through a housing case, a process to block the hole is required in order to obtain a waterproofing effect. However, in the present disclosure, since the housing case is never formed with such a hole in the first place, a process to block such a hole is not required.

Note that when such a hole has been blocked, a blocked portion where the hole has been blocked has a different rigidity than other locations. Thus, variation in the pressing force with which the battery stack is pressed might arise between the blocked portion and the other locations.

In contrast thereto, such a hole is not formed in the housing case of the present disclosure. Accordingly, such variation in the pressing force against the battery stack as a result of forming a hole does not arise. Thus, the present disclosure enables variation in the pressing force with which the battery stack is pressed to be suppressed.

A battery module of a second aspect is the battery module of the first aspect, wherein each of two battery cell stacking direction ends of the battery stack is provided with an end plate, an outer face of each of the end plates is provided with a groove formed running along a vertical direction from an upper edge of the end plate, and each of the grooves is set with a depth such that the outer face of the corresponding end plate projects further outward than an outer face of a claw portion formed at a gripping member for gripping two battery cell stacking direction end portions of the battery stack in a state in which the claw portion is in an inserted state in the groove.

In the battery module of the second aspect, the end plates are provided at the two battery cell stacking direction ends of the battery stack. A groove running along the vertical direction from the upper edge of the end plate is formed in the outer face of each of the end plates.

The gripping member for gripping the two battery cell stacking direction end portions of the battery stack is formed with the claw portion. The claw portion is capable of being inserted into the groove formed in the corresponding end plate. Accordingly, the groove formed in the end plate is set with a depth such that the outer face of the end plate projects further outward than the outer face of the claw portion in a state in which the claw portion of the gripping member is in an inserted state in the groove of the end plate.

The present disclosure thus enables the battery stack to be housed in the housing case without the claw portion of the gripping member being impeded by the housing case in a state in which the claw portion of the gripping member is inserted into the groove formed in the corresponding end plate of the battery stack.

Moreover, in the present disclosure, in a state in which the battery stack is housed inside the housing case, the claw portion of the gripping member can be withdrawn from inside the groove formed in the end plate of the battery stack without being impeded by the housing case.

Note that as a minimum, it is sufficient that the "groove formed running along a vertical direction from an upper edge of the end plate" be formed from the upper edge of the end plate, and the groove may be formed spanning from the upper edge to a lower edge of the end plate, or the groove may be formed spanning from the upper edge of the end plate to a vertical direction central portion of the end plate.

A battery module manufacturing method of a third aspect is applied to manufacture of the battery module of the first aspect or the second aspect. The battery module manufacturing method includes a pressing process of pressing the battery stack along the battery cell stacking direction using a gripping member for gripping two battery cell stacking direction end portions of the battery stack, a battery stack insertion process of inserting the battery stack that has been pressed in the pressing process into the housing case together with the gripping member, and a shim insertion process of inserting the shim between the battery stack and the housing case along the gripping member that has been inserted into the housing case during the battery stack insertion process.

The battery module manufacturing method of the third aspect includes the pressing process, the battery stack insertion process, and the shim insertion process.

First, in the pressing process, the battery stack is pressed along the stacking direction using the gripping member for gripping the two battery cell stacking direction end portions of the battery stack.

Then, in the battery stack insertion process, the battery stack that has been pressed in the pressing process is inserted into the housing case together with the gripping member.

Next, in the shim insertion process, the shim is inserted between the battery stack and the housing case along the gripping member that has been inserted into the housing case during the battery stack insertion process.

Namely, in the present disclosure, the gripping member for gripping and pressing the battery stack is employed during insertion of the shim between the battery stack and the housing case. The gripping member is used to form an insertion gap between the battery stack and the housing case, thus allowing the shim to be inserted into the insertion gap along the gripping member.

In this manner, in the present disclosure, even if manufacturing tolerances are present in the housing case and the battery stack, providing the shim between the battery stack and the housing case enables variation in the pressing force with which the battery stack is pressed to be suppressed.

Moreover, since in the present disclosure the gripping member for gripping and pressing the battery stack is employed to form the insertion gap for the shim, a separate member is not required in order to form the insertion gap.

A battery module manufacturing method of a fourth aspect is the battery module manufacturing method of the third aspect, wherein the gripping member is configured including a plate-shaped base portion configured to apply a pressing force to press the battery stack and configured to guide the shim toward a lower side, a claw portion that extends downward from the base portion and grips the corresponding battery cell stacking direction end portion, an inner side plate that extends along the battery cell stacking direction from the base portion, and that is disposed at a side of the battery stack in a state in which the claw portion is gripping the corresponding battery cell stacking direction end portion, and an outer side plate that extends along the battery cell stacking direction from the base portion, and that is provided on an opposite side of the base portion from the inner side plate.

In the battery module manufacturing method of the fourth aspect, the gripping member is configured including the base portion, the claw portion, the inner side plate, and the outer side plate.

The base portion is formed in a plate shape and is configured to apply a pressing force to press the battery stack. The base portion is also configured to guide the shim toward the lower side during insertion of the shim between the battery stack and the housing case.

The claw portion extends downward from the base portion and grips the corresponding battery cell stacking direction end portion.

The inner side plate extends along the battery cell stacking direction from the base portion, and is disposed at the side of the battery stack in a state in which the claw portion is gripping the corresponding battery cell stacking direction end portion.

The outer side plate extends along the battery cell stacking direction from the base portion, and is provided on the opposite side of the base portion from the inner side plate. Namely, the outer side plate is disposed at the outer side of the battery stack in a state in which the claw portion is gripping the corresponding battery cell stacking direction end portion.

Note that the gripping member is configured to apply pressing force along the battery cell stacking direction of the battery stack from the outer side toward the inner side of the battery stack. Accordingly, providing the gripping member with the inner side plate enables the gripping member to be suppressed from deforming under this pressing force.

Moreover, providing the base portion of the gripping member with the inner side plate and the outer side plate enables the rigidity of the gripping member to be improved, enabling deformation of the overall gripping member to be further suppressed.

A battery module manufacturing method of a fifth aspect is the battery module manufacturing method of the fourth aspect, wherein a groove is provided at an end plate at each of two battery cell stacking direction ends of the battery stack, the groove being formed from an upper edge of the end plate so as to run along a vertical direction at an outer face of the end plate, the base portion is oriented such that a face from which the outer side plate extends is an outer face capable of guiding the shim toward the lower side along the outer face, and the base portion is set such that in a state in which the claw portion has been inserted into the groove, the base portion is disposed at an upper side of the end plate and the outer face of the base portion projects further outward than the outer face of the end plate.

In the battery module manufacturing method of the fifth aspect, the end plates are provided to each of the two battery cell stacking direction ends of the battery stack, and the outer face of each of the end plates is formed with the groove running along the vertical direction from the upper edge of the end plate. The base portion of the gripping member is oriented such that the face from which the outer side plate extends configures the outer face. This outer face is capable of guiding the shim.

Note that the base portion of the gripping member is disposed at the upper side of the corresponding end plate, and the outer face of the base portion is set so as to project further outward than the outer face of the end plate, in a state in which the claw portion of the gripping member has been inserted into the groove in the corresponding end plate.

As described above, the shim is guided toward the lower side along the outer face of the base portion of the gripping member. In this manner, when the shim is moved toward the lower side along the outer face of the base portion, the shim moves from the base portion of the gripping member toward the claw portion side. Accordingly, in the present disclosure the outer face of the end plate is configured to project further outward than the outer face of the claw portion.

In the case of a comparative example in which the outer face of the end plate projects out beyond the outer face of the base portion, the shim might be impeded by an upper edge of the end plate when moving the shim from the base portion toward the claw portion side.

Thus in the present disclosure, the base portion is disposed at the upper side of the end plate, and the outer face of the base portion is set so as to project further outward than the outer face of the end plate, in a state in which the claw portion has been inserted into the corresponding groove.

This enables the shim to be prevented from being impeded by the upper edge of the end plate when moving the shim from the base portion of the gripping member toward the claw portion side (lower side), thus enabling the shim to be smoothly guided from the outer face of the base portion of the gripping member toward the side of the outer face of the end plate.

As described above, the battery module of the first aspect exhibits the excellent advantageous effect of enabling variation in the pressing force with which a battery stack is pressed to be suppressed, even if manufacturing tolerances are present in the housing case and the battery stack.

The battery module of the second aspect exhibits the excellent advantageous effect of allowing the gripping member to be housed inside the housing case in a state gripping the battery stack, and then withdrawn from the housing case.

The battery module manufacturing method of the third aspect exhibits the excellent advantageous effect of enabling an insertion gap to be formed between the battery stack and the housing case and enabling insertion of the shim into the insertion gap without requiring a separate member to form the insertion gap.

The battery module manufacturing method of the fourth aspect exhibits the excellent advantageous effect of enabling the gripping member to be suppressed from deforming when a pressing force is applied to the gripping member.

The battery module manufacturing method of the fifth aspect exhibits the excellent advantageous effect of enabling the shim to be smoothly inserted between the battery stack and the housing case.

BRIEF DESCRIPTION OF THE DRAWINGS

Exemplary embodiments of the present invention will be described in detail based on the following figures, wherein.

DETAILED DESCRIPTION

Figure 1:
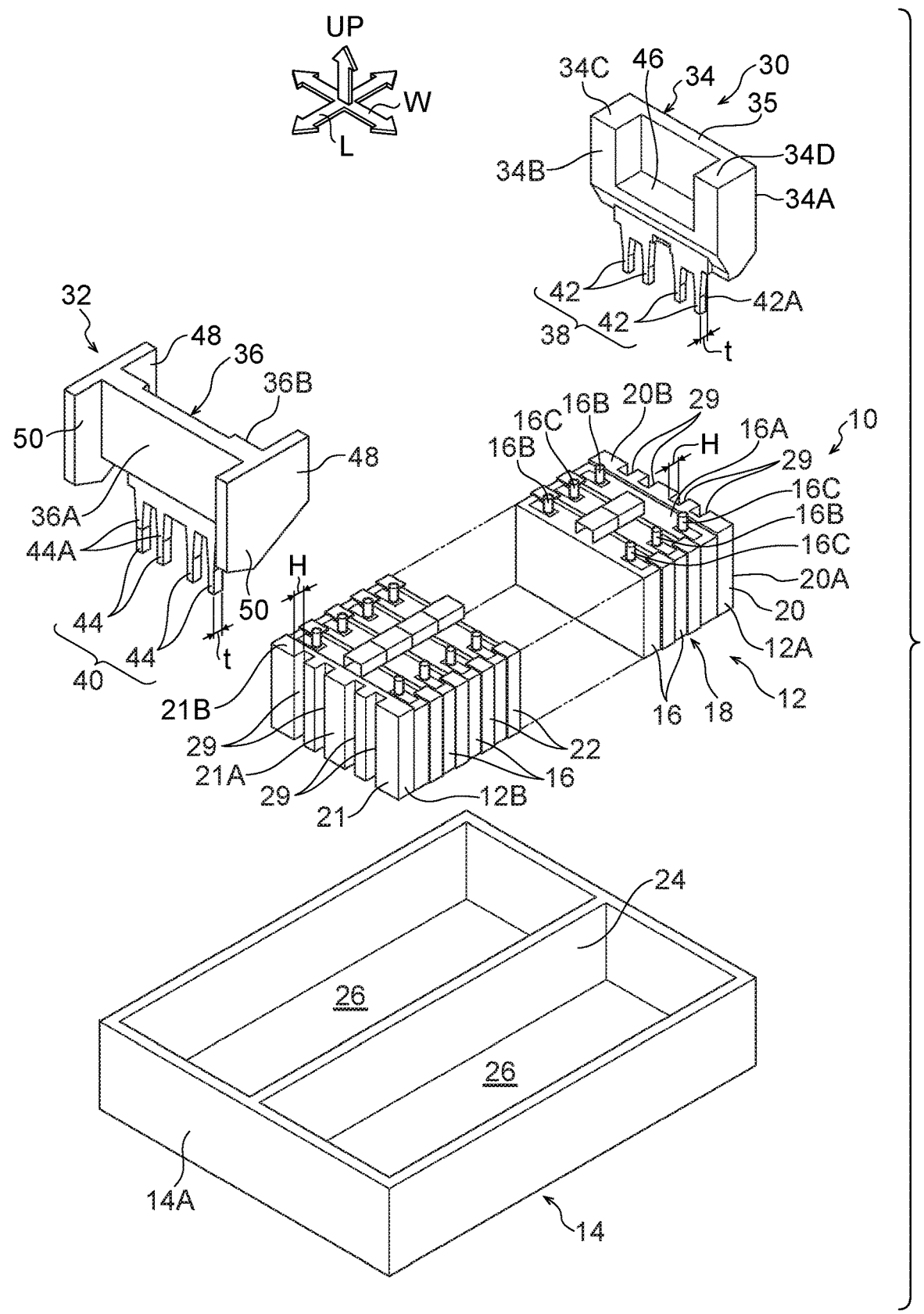
FIG. 1 is an exploded perspective view illustrating a battery stack and a housing case configuring parts of a battery module according to an exemplary embodiment, and gripping members configured to grip and press the battery stack, as viewed obliquely from an upper side.

Explanation follows regarding a battery module 10 according to an exemplary embodiment of the present disclosure, with reference to the drawings. Note that in the drawings, the arrow UP, the arrow L, and the arrow W respectively indicate an upward direction, a length direction, and a width direction of the battery module 10 according to the present exemplary embodiment, as appropriate.

Battery Module Configuration

First, explanation follows regarding configuration of the battery module 10 according to an exemplary embodiment of the present disclosure.

Figure 2:
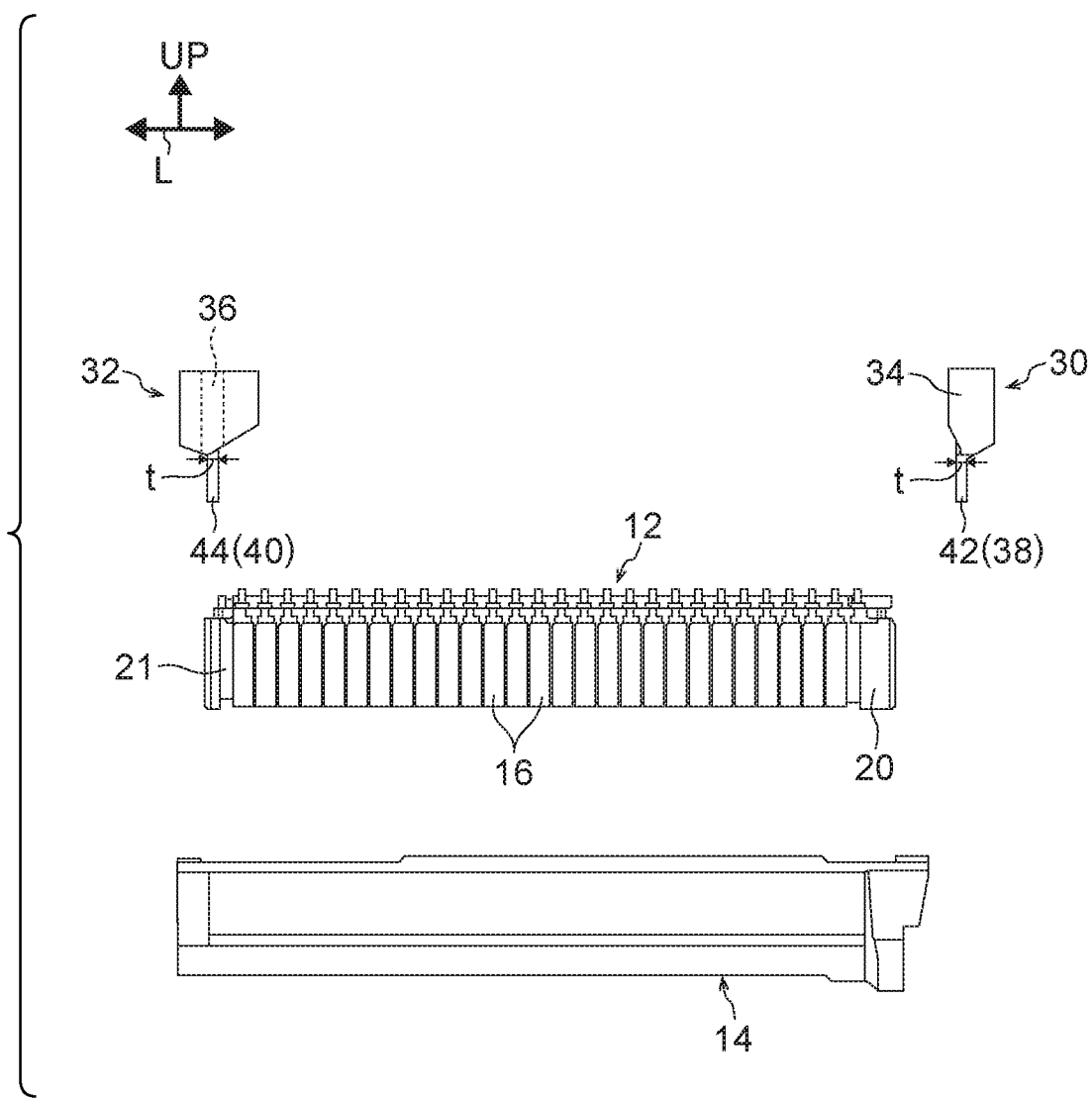
FIG. 2 is a side view corresponding to FIG. 1.

FIG. 1 is an exploded perspective view illustrating a battery stack 12 and a housing case 14 configuring parts of the battery module 10 according to the present exemplary embodiment of the present disclosure, and gripping members 30, 32 for gripping and pressing the battery stack 12, as viewed obliquely from the upper side. FIG. 2 is a side view corresponding to FIG. 1.

As illustrated in FIG. 1, the battery module 10 is configured including the battery stack 12 made of resin, and the housing case 14 made of metal. The battery stack 12 is configured including a stacked battery body 18 in which plural battery cells 16 are stacked along a horizontal direction. The battery stack 12 is also provided with resin end plates 20, 21 at two end portions 12A, 12B of the stacked battery body 18 that runs along a stacking direction of the battery cells 16 (arrow L direction).

The battery stack 12 is formed in a substantially rectangular block shape with its length direction along the stacking direction of the battery cells 16. Each of the end plates 20, 21 has a substantially rectangular plate shape with a plate thickness direction in the stacking direction. Each of the battery cells 16 is for example configured by a rechargeable battery that is capable of being charged and discharged, such as a lithium-ion rechargeable battery, and is a rectangular battery with a flattened rectangular block shape. Note that there is no limitation to a lithium-ion rechargeable battery, and other types of rechargeable battery, such as a nickel-metal hydride rechargeable battery, may be employed.

An upper face 16A of each of the battery cells 16 is provided with a positive terminal 16B and a negative terminal 16C, each having a circular column shape. The battery cells 16 are arranged with alternating orientations such that the positive terminals 16B and the negative terminals 16C thereof are arranged alternately along the length direction of the stacked battery body 18 (the stacking direction of the battery cells 16). The positive terminals 16B and the negative terminals 16C of adjacent battery cells 16 in the length direction of the stacked battery body 18 are connected together through non-illustrated busbars, these being conductive members.

The stacked battery body 18 has a configuration in which the battery cells 16 are stacked alternately with resin frames 22. Namely, in the stacked battery body 18, a resin frame 22, serving as an insulating member, is provided between each pair of adjacent battery cells 16.

The resin frames 22 are formed of a resin such as polypropylene. Battery cells 16 are arranged at the two length direction ends of the stacked battery body 18. The end plates 20, 21, also formed of a resin such as polypropylene, are for example joined to and integrated with the battery cells 16 arranged at the two length direction ends of the stacked battery body 18.

In the present exemplary embodiment, the housing case 14 is formed of die-cast aluminum or the like, and is formed in a box shape open at the upper side (the entire upper face is open in this example). No holes are formed in a side wall 14A of the housing case 14. The battery stack 12 can be housed inside the housing case 14 (see FIG. 20).

A partition wall 24 is provided at a width direction central portion of the housing case 14. The inside of the housing case 14 is partitioned into two by the partition wall 24. Two housing sections 26 are provided as a result. Battery stacks 12 can be respectively housed inside the two housing sections 26.

Note that it is sufficient that the housing case 14 and the battery stack 12 be capable of moving relative to each other. Namely, configuration may be made such that the battery stack 12 is moved relative to the housing case 14, or configuration may be made such that the housing case 14 is moved relative to the battery stack 12.

In the present exemplary embodiment, the illustrated shape of the housing case 14 has been simplified. In reality, the housing case 14 is provided with reinforcing ribs or the like to increase the inherent rigidity of the housing case 14.

In this example, two battery stacks 12 can be housed inside a single housing case 14. However, the capacity of the housing case may be increased or set such that a single battery stack is housed inside a single housing case. Although not illustrated in the drawings, cooling members such as cooling fans to cool the battery cells 16 may also be housed inside the housing sections 26 of the housing case 14 in addition to the aforementioned members.

Figure 10:
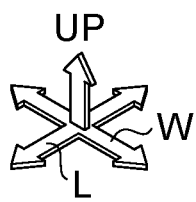
FIG. 10 is an exploded perspective view illustrating a state in which a shim is being inserted between a battery stack and a housing case configuring parts of a battery module according to an exemplary embodiment, as viewed obliquely from the upper side.
Figure 10:
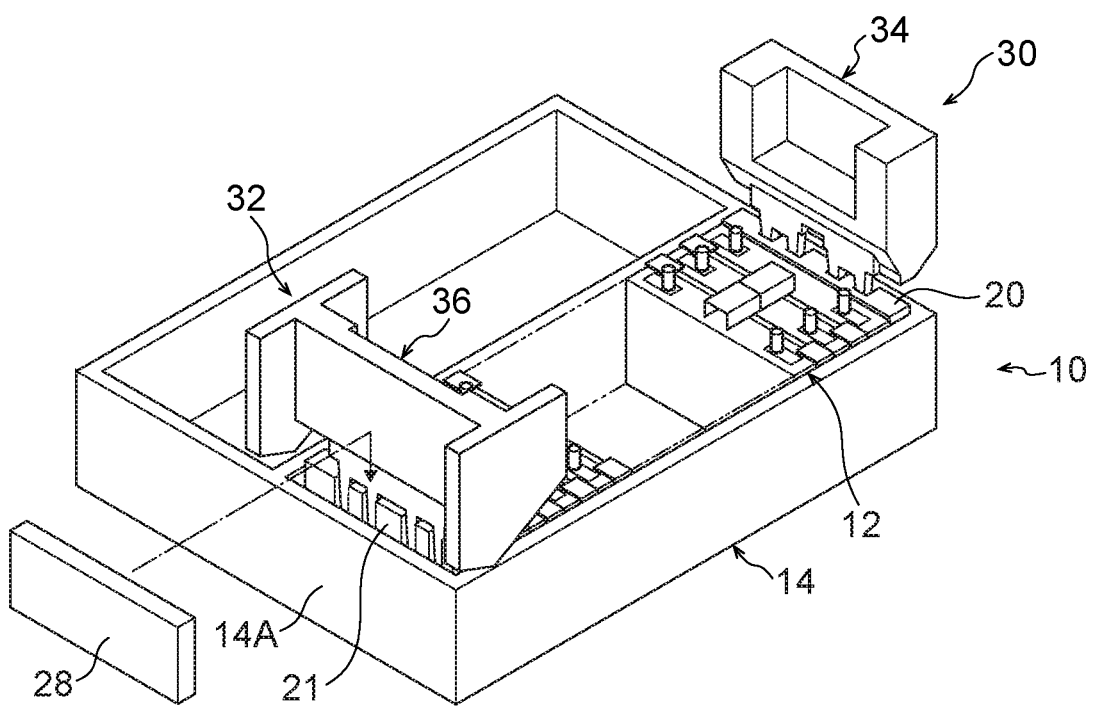
Figure 20:
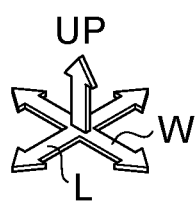
FIG. 20 is a perspective view illustrating a state in which a battery stack configuring part of a battery module according to an exemplary embodiment and a shim have been housed inside a housing case, as viewed obliquely from the upper side.
Figure 20:
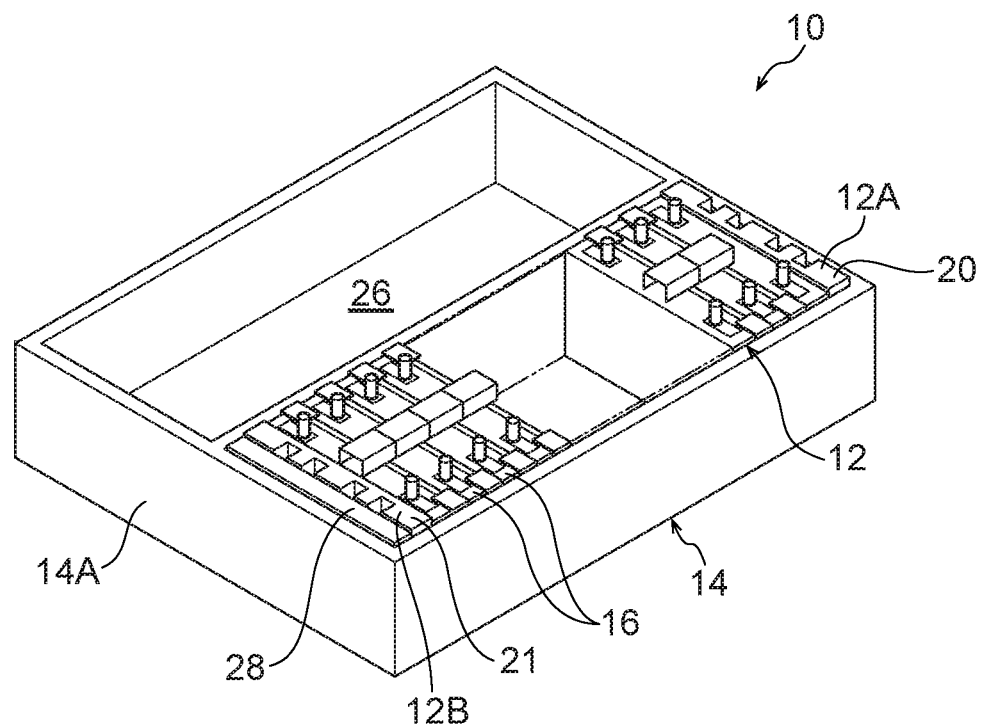

FIG. 10 is an exploded perspective view illustrating a state in which a shim (spacer) 28 is being inserted between the housing case 14 and the battery stack 12 housed inside the housing case 14, as viewed obliquely from the upper side. FIG. 20 is a perspective view illustrating a state in which the battery stack 12 is housed inside the housing case 14, and the shim 28 has been inserted between the battery stack 12 and the housing case 14, as viewed obliquely from the upper side.

As illustrated in FIG. 10 and FIG. 20, in the present exemplary embodiment, the shim 28 can be disposed in the stacking direction of the battery cells 16 between the side wall 14A of the housing case 14 and the end plate 21 provided at the other length direction (arrow L direction; stacking direction of the battery cells 16) end portion 12B of the battery stack 12. Note that in the present exemplary embodiment, the shim 28 is a plate member made of metal (such as stainless steel).

By disposing the shim 28 between the battery stack 12 and the housing case 14 in the stacking direction of the battery cells 16 in this manner, the battery stack 12 is pressed along the stacking direction of the battery cells 16 by reaction force from the shim 28. This retains ionic conductivity between electrolytic material particles, thereby maintaining the battery performance of the battery stack 12.

As illustrated in FIG. 1, an outer face 20A of the end plate 20 and an outer face 21A of the end plate 21 of the battery stack 12 are each provided with grooves 29 (four each in this example) that run along a vertical direction from an upper edge 20B of the end plate 20 and from an upper edge 21B of the end plate 21 respectively.

Figure 4:
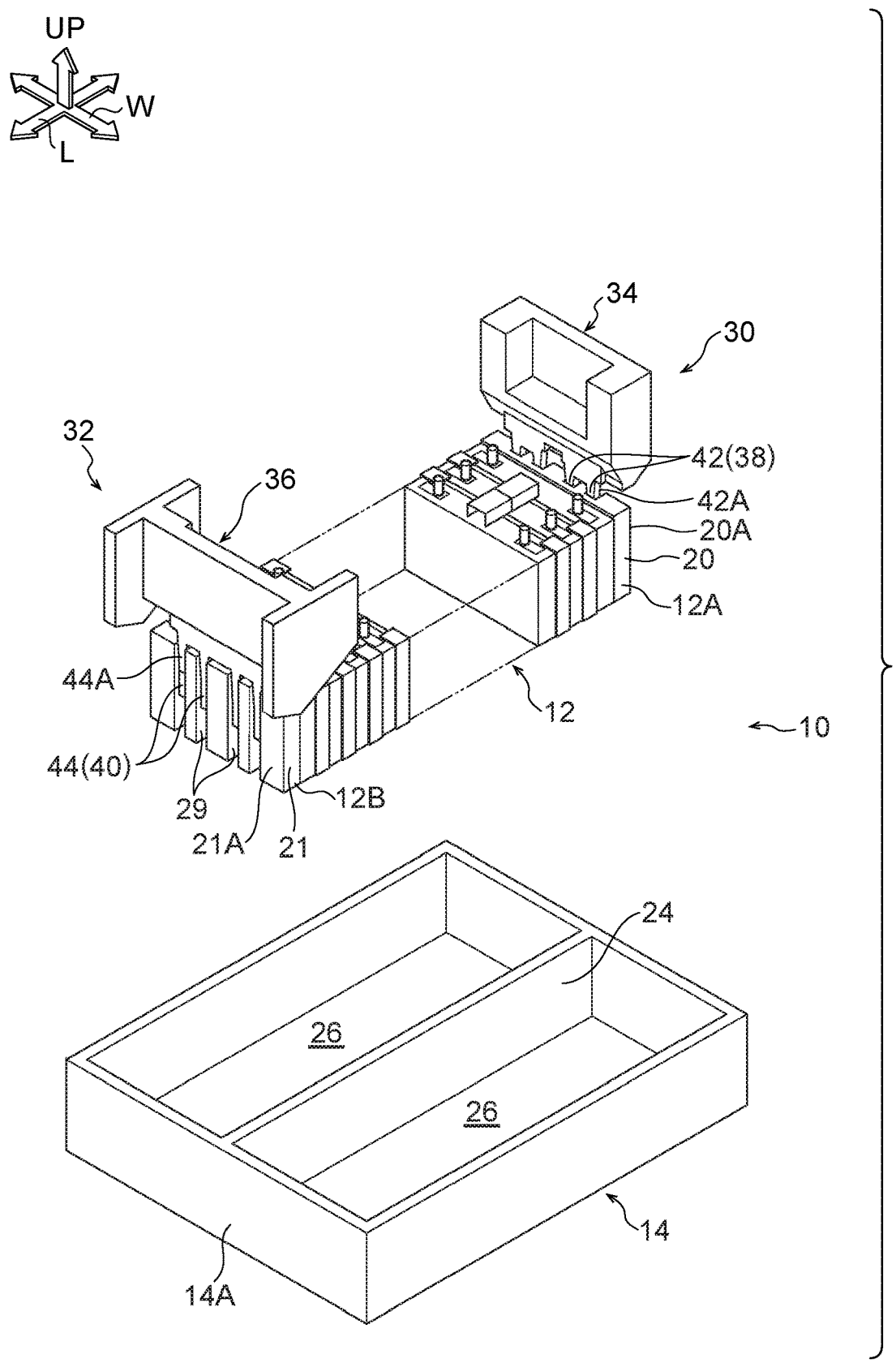
FIG. 4 is an exploded perspective view illustrating a state in which two length direction end portions of a battery stack configuring part of a battery module according to an exemplary embodiment are gripped by respective gripping members, as viewed obliquely from the upper side.
Figure 5:
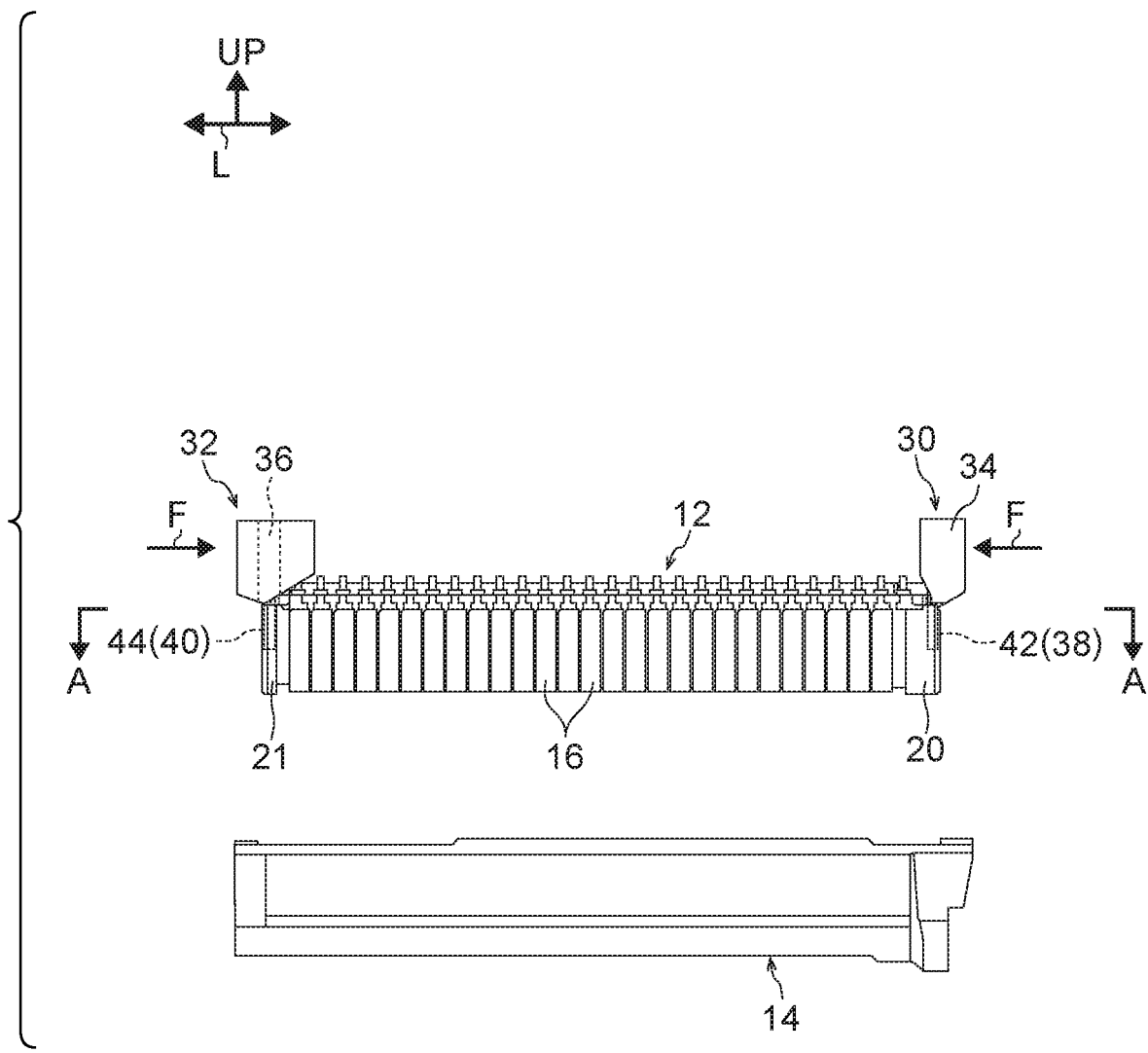
FIG. 5 is a side view corresponding to FIG. 4.

As illustrated in FIG. 4 and FIG. 5, the present exemplary embodiment is provided with the gripping member 30 configured to grip the side of the end plate 20 provided to the one length direction end portion 12A of the battery stack 12, and a gripping member 32 configured to grip the side of the end plate 21 provided to the other length direction end portion 12B of the battery stack 12.

FIG. 4 is an exploded perspective view illustrating the battery stack 12, the housing case 14, and the gripping members 30, 32 that grip and press the battery stack 12, as viewed obliquely from the upper side. FIG. 5 is a side view corresponding to FIG. 4.

The gripping member 30 and the gripping member 32 illustrated in FIG. 4 and FIG. 5 are configured such that the distance therebetween is variable, and the gripping member 32 is capable of moving relative to the gripping member 30. In the present exemplary embodiment, the battery stack 12 can be pressed along its length direction by reducing the distance between the gripping members 30, 32.

As illustrated in FIG. 10, the gripping member 30 and the gripping member 32 have different shapes, according to whether or not the gripping member is used to insert the shim 28 between the battery stack 12 and the housing case 14. As described in detail later, the gripping member 32 is configured to enable insertion of the shim 28 between the battery stack 12 and the housing case 14.

In a state in which the battery stack 12 is housed inside the housing case 14 as illustrated in FIG. 20, a shim 28 is not disposed between the battery stack 12 and the housing case 14 on the side of the end plate 20 provided to the one length direction end portion 12A of the battery stack 12. On the other hand, a shim 28 is disposed between the battery stack 12 and the housing case 14 on the side of the end plate 21 provided to the other length direction end portion 12B of the battery stack 12.

Note that although the present exemplary embodiment is set such that the shim 28 is provided on the other length direction end portion 12B side of the battery stack 12, respective shims 28 may be inserted at the length direction end portions 12A, 12B on both sides of the battery stack 12. In such cases, gripping members 32 of identical configuration to each other are employed. Obviously gripping members 32 of identical configuration to each other may be employed regardless of whether or not a shim 28 is inserted.

Gripping Members 30, 32

Explanation follows regarding the gripping members 30, 32.

As illustrated in FIG. 1, the gripping members 30, 32 are formed with dimensions tailored to the width direction of the battery stack 12 (arrow W direction). The gripping members 30, 32 are respectively configured including base portions 34, 36 each formed in a substantially rectangular shape as viewed along the length direction of the battery stack 12, and claw portions 38, 40 that extend downward from lower portions of the respective base portions 34, 36. The claw portion 38 and the claw portion 40 have substantially the same shape as each other.

First, explanation is given regarding the claw portions 38, 40 of the respective gripping members 30, 32, followed by explanation regarding the base portions 34, 36 of the respective gripping members 30, 32.

As illustrated in FIG. 4 and FIG. 5, the gripping member 30 grips the side of the end plate 20 provided to the one length direction end portion 12A of the battery stack 12, and the gripping member 32 grips the side of the end plate 21 provided to the other length direction end portion 12B of the battery stack 12, such that pressing force is applied to both the base portions 34, 36.

As illustrated in FIG. 1, the claw portion 38 of the gripping member 30 is provided with provided with two leg pieces 42, and the claw portion 40 of the gripping member 32 is provided with two leg pieces 44, the respective leg pieces 42, 44 being arranged along the width direction of the battery stack 12. The leg pieces 42, 44 respectively provided to the claw portion 38 of the gripping member 30 and to the claw portion 40 of the gripping member 32 are capable of being inserted into the respective grooves 29 formed in the end plates 20, 21 of the battery stack 12.

Thus, as illustrated in FIG. 4 and FIG. 5, in a state in which the leg pieces 42 of the claw portion 38 of the gripping member 30 and the leg pieces 44 of the claw portion 40 of the gripping member 32 have been inserted into the respective grooves 29 of the end plates 20, 21, the base portion 34 of the gripping member 30 and the base portion 36 of the gripping member 32 are disposed at the upper sides of the respective end plates 20, 21.

By then bringing the gripping member 32 closer to the gripping member 30, the battery stack 12 is pressed and compressed along its length direction through the claw portions 38, 40.

Figure 14:
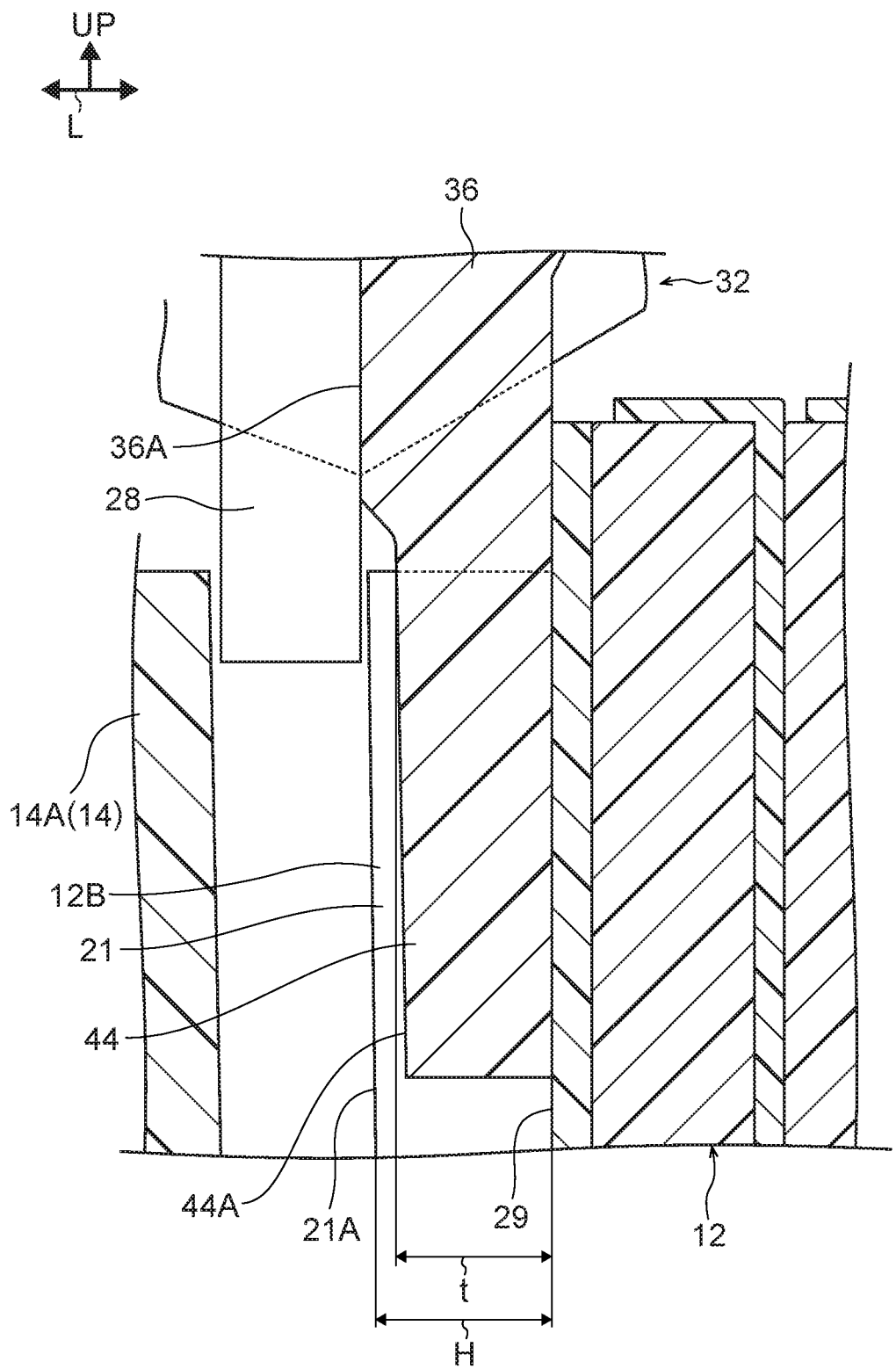
FIG. 14 is an enlarged cross-section of relevant portions in FIG. 10, illustrating a state in which a shim is being inserted between a battery stack and a housing case configuring parts of a battery module according to an exemplary embodiment.

FIG. 14 is an enlarged cross-section of relevant portions in FIG. 10, illustrating a state in which the shim 28 is being inserted along the gripping member 32 between the battery stack 12 and the housing case 14 on the side of the end plate 21 provided to the other length direction end portion 12B of the battery stack 12, in a state in which the battery stack 12 is housed inside the housing case 14.

As illustrated in FIG. 1 and FIG. 14, in the present exemplary embodiment, leading end sides of both the leg pieces 42 of the gripping member 30 and the leg pieces 44 of the gripping member 32 are thinner than base sides thereof, and a thickness t of the base sides is set smaller than a depth H of the respective grooves 29 formed in the end plates 20, 21 of the battery stack 12.

Thus, as illustrated in FIG. 4 and FIG. 14, in a state in which the leg pieces 42 of the claw portion 38 of the gripping member 30 and the leg pieces 44 of the claw portion 40 of the gripping member 32 have been inserted into the respective grooves 29 of the end plates 20, 21, the outer face 20A of the end plate 20 and the outer face 21A of the end plate 21 project further outward than outer faces 42A of the leg pieces 42 and outer faces 44A of the leg pieces 44.

As illustrated in FIG. 10 and FIG. 14, in the state in which the battery stack 12 is housed inside the housing case 14, the shim 28 is disposed between the battery stack 12 and the housing case 14 on the end plate 21 side of the battery stack 12.

Base Portion 34 of Gripping Member 30

Explanation follows regarding the base portion 34 of the gripping member 30.

As illustrated in FIG. 1, the base portion 34 of the gripping member 30 has a substantially rectangular block shape. A pressing force F (see FIG. 5) toward the gripping member 32 side is applied to an upper portion of an outer face 34A of the base portion 34 in order to press the battery stack 12. A substantially rectangular block shaped recess 46 is formed on an inner face 34B side of the base portion 34 so as to leave an outer wall portion 35 including two width direction end portions 34C, 34D of the base portion 34 and the outer face 34A of the base portion 34.

Forming the recess 46 in this manner enables sink marks to be suppressed from forming in the base portion 34 during molding. The two width direction end portions 34C, 34D of the base portion 34 that remain are linked together by the outer wall portion 35, such that these portions mutually reinforce each other.

As described above, the rigidity of the gripping member 30 is secured, and the gripping member 30 can be suppressed from deforming under the pressing force F acting on the outer face 34A of the base portion 34 (see FIG. 5).

Base Portion 36 of Gripping Member 32

Next, explanation follows regarding the base portion 36 of the gripping member 32.

Figure 3A:
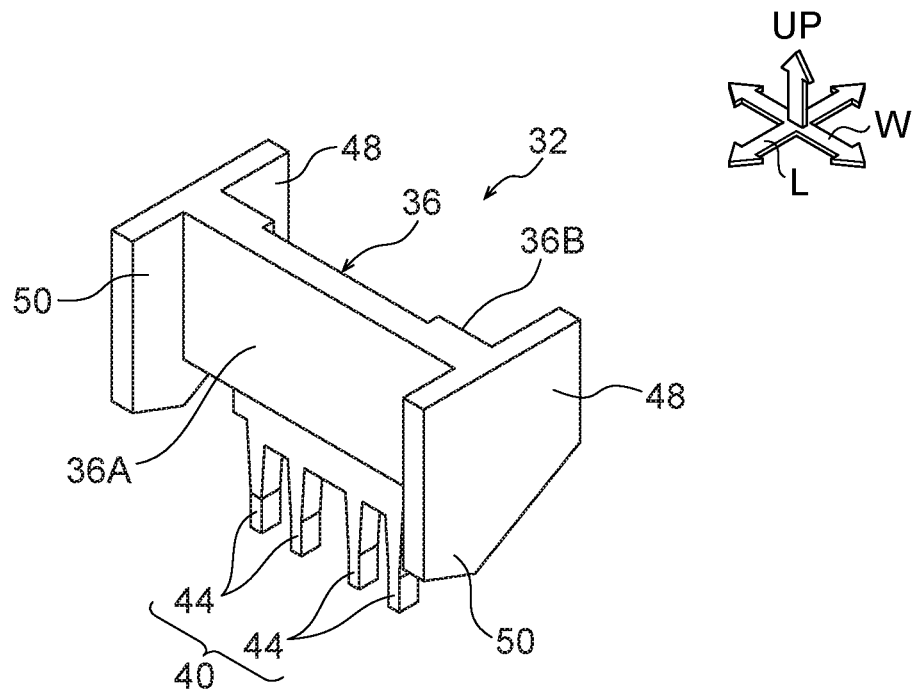
FIG. 3A is a perspective view illustrating a gripping member configured to grip and press a battery stack configuring part of a battery module according to an exemplary embodiment, as viewed from the side of an outer face.
Figure 3B:
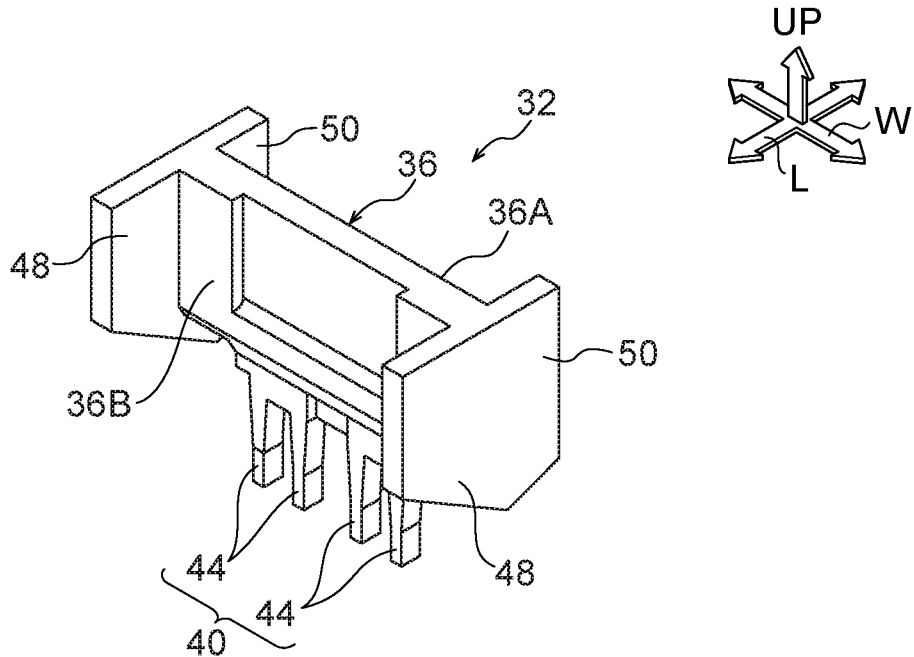
FIG. 3B is a perspective view illustrating a gripping member of a battery module according to an exemplary embodiment, as viewed from the side of an inner face.

FIG. 3A is a perspective view illustrating the gripping member 32 as viewed from the side of an outer face 36A, and FIG. 3B is a perspective view illustrating the gripping member 32 as viewed from the side of an inner face 36B.

As illustrated in FIG. 1 and FIG. 3A, the base portion 36 of the gripping member 32 has a rectangular plate shape. A pressing force F (see FIG. 5) toward the gripping member 30 side is applied to an upper portion of the outer face 36A of the base portion 36 in order to press the battery stack 12.

As illustrated in FIG. 10, the base portion 36 is capable of guiding the shim 28 when the shim 28 is being inserted between the battery stack 12 and the housing case 14. Note that the shim 28 is capable of abutting the lower portion of the base portion 36 so as to be guided toward the lower side along the outer face 36A of the base portion 36.

As illustrated in FIG. 1, FIG. 3A, and FIG. 3B, inner side plates 48 extend along the stacking direction of the battery cells 16 from the inner face 36B of the base portion 36 at the two width direction end portions of the base portion 36. Moreover, outer side plates 50 extend along the stacking direction of the battery cells 16 from the outer face 36A of the base portion 36 at the two width direction end portions of the base portion 36.

Namely, the base portion 36 has an H-shaped profile in plan view. This secures the rigidity of the gripping member 32, such that the gripping member 32 can be suppressed from deforming under the pressing force F acting on the outer face 36A of the base portion 36 (see FIG. 5).

Although in the present exemplary embodiment, the respective inner side plates 48 and outer side plates 50 are configured to form a single straight line with each other along the stacking direction of the battery cells 16, there is no limitation thereto. For example, although not illustrated in the drawings, an inner side plate 48 at a width direction central portion may be formed in addition to the inner side plates 48 at both width direction end portions of the base portion 36.

Although the inner side plates 48 and the outer side plates 50 are formed with substantially the same plate thickness as each other in the present exemplary embodiment, the plate thicknesses of the inner side plates 48 and the outer side plates 50 may differ from each other.

Figure 8:
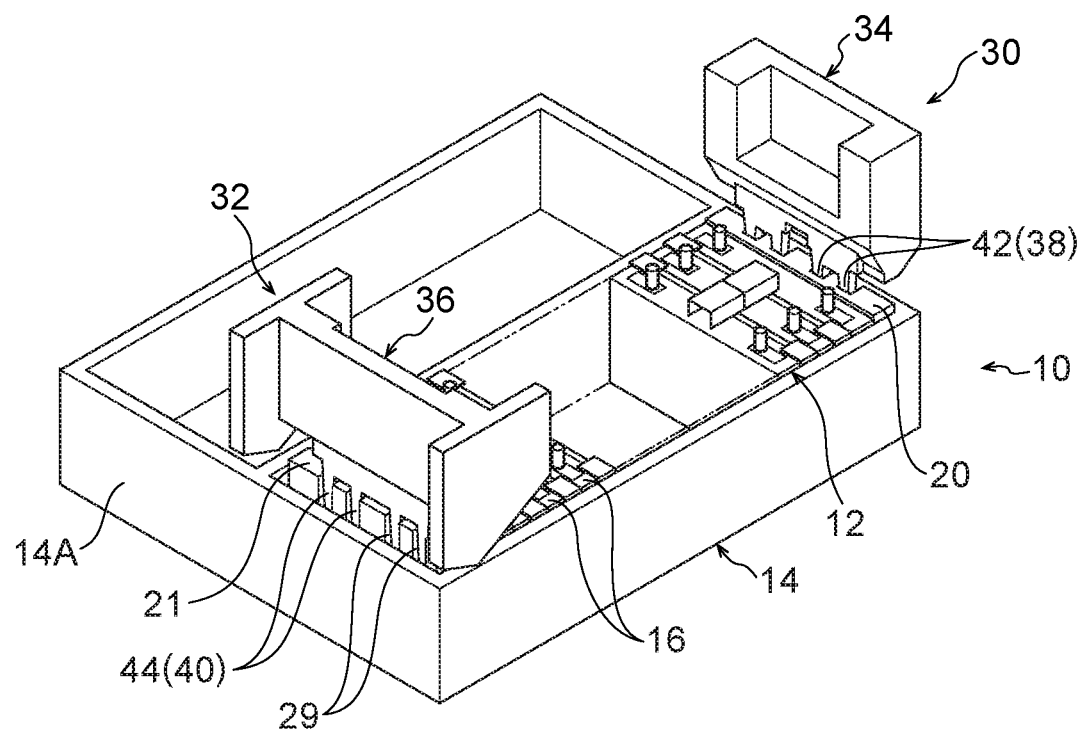
FIG. 8 is a perspective view illustrating a state in which a battery stack configuring part of a battery module according to an exemplary embodiment has been inserted into a housing case, as viewed obliquely from the upper side.
Figure 9:
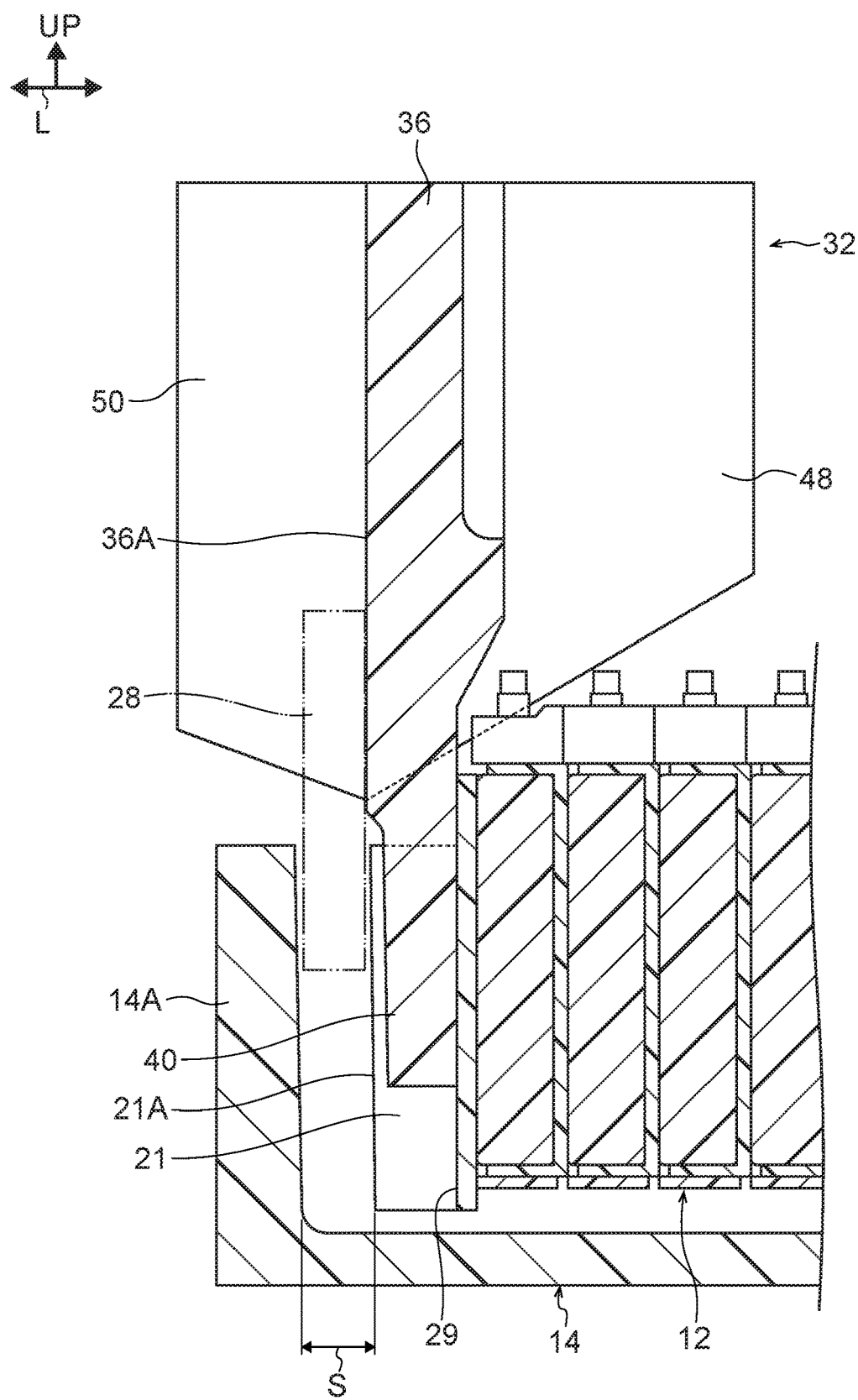
FIG. 9 is an enlarged cross-section of relevant portions in FIG. 8.

FIG. 8 is a perspective view illustrating a state in which the battery stack 12 has been inserted into the housing case 14. FIG. 9 is an enlarged cross-section of relevant portions in FIG. 8. FIG. 9 illustrates a state in which the claw portion 40 of the gripping member 32 has been inserted into the grooves 29 of the end plate 21, with a state in which the shim 28 is being inserted between the battery stack 12 and the housing case 14 being illustrated by a double-dotted intermittent line.

In the present exemplary embodiment, in the state in which the claw portion 40 of the gripping member 32 has been inserted into the grooves 29 of the end plate 21 as illustrated in FIG. 9, the outer face 36A of the base portion 36 is set so as to project further outward than the outer face 21A of the end plate 21.

Figure 15:
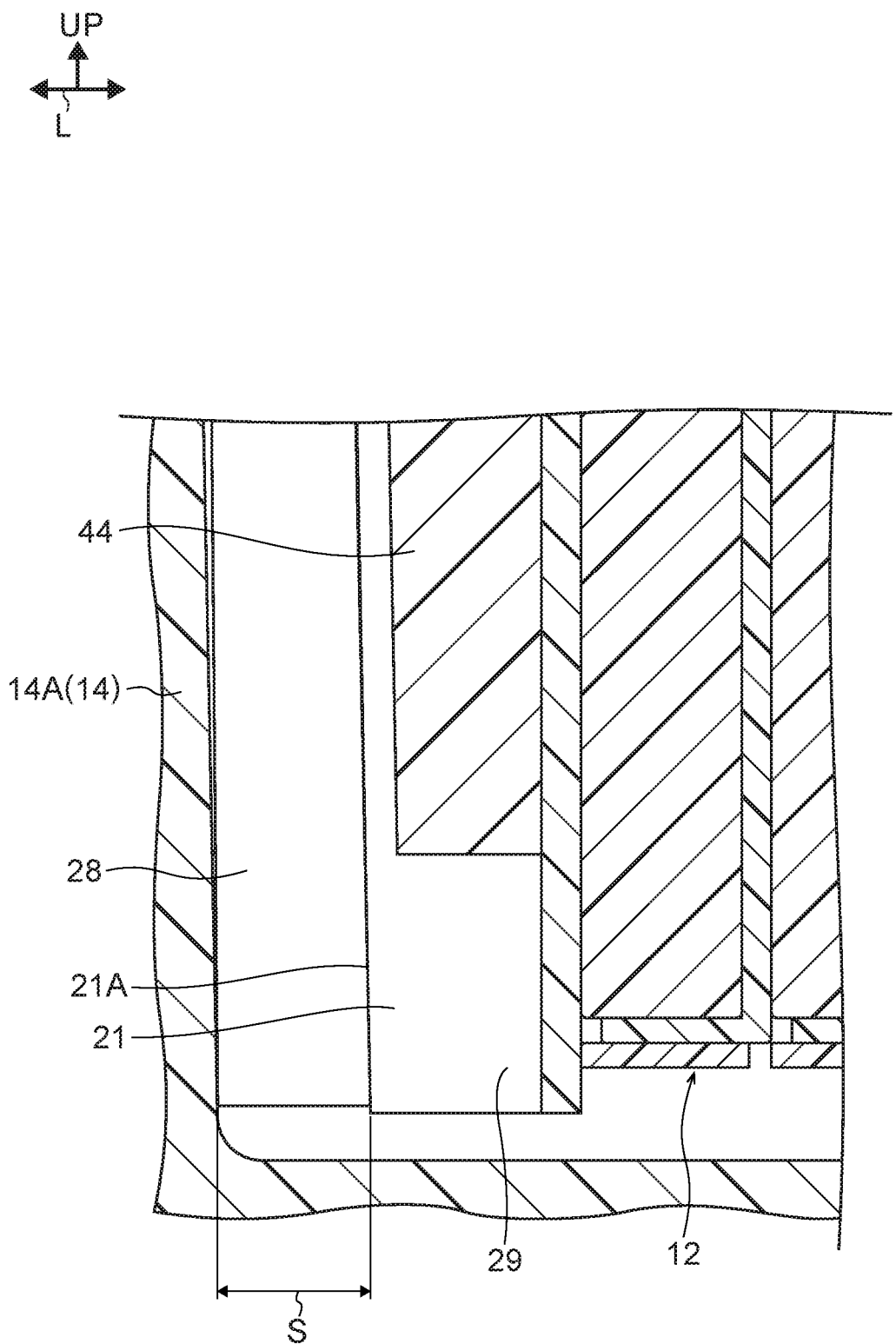
FIG. 15 is an enlarged cross-section of relevant portions in FIG. 10, illustrating a state in which a shim has been inserted between a battery stack and a housing case configuring parts of a battery module according to an exemplary embodiment.

FIG. 14 and FIG. 15 are both enlarged cross-sections of relevant portions in FIG. 10. FIG. 14 illustrates a state in which the shim 28 is being inserted between the battery stack 12 and the housing case 14. FIG. 15 illustrates a state in which the shim 28 has been inserted between the battery stack 12 and the housing case 14, with an upper portion side of the shim 28 being omitted from illustration.

Figure 18:
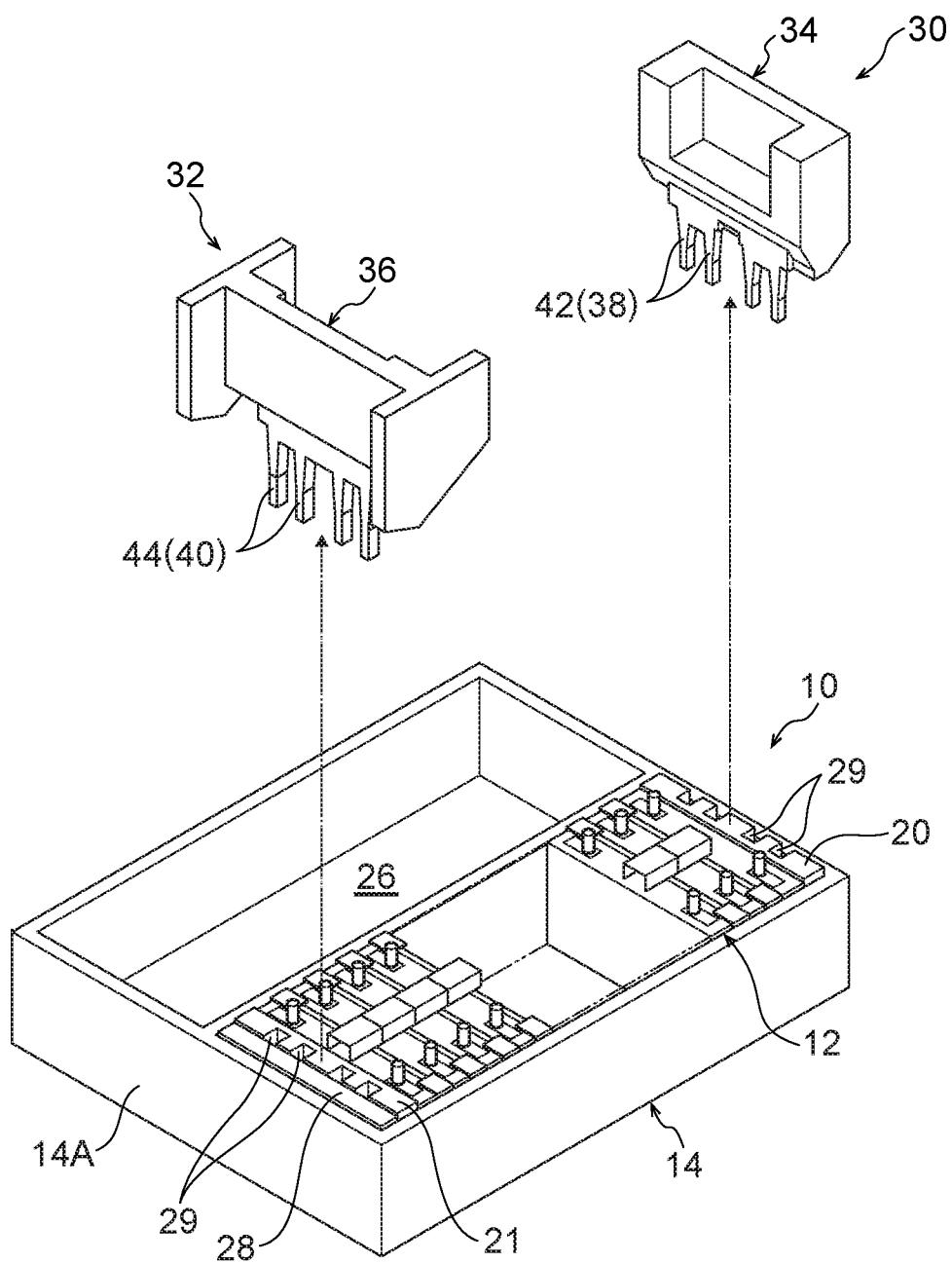
FIG. 18 is an exploded perspective view illustrating a state in which gripping members have been withdrawn from the two length direction end portions of a battery stack configuring part of a battery module according to an exemplary embodiment, as viewed obliquely from the upper side.
Figure 19:
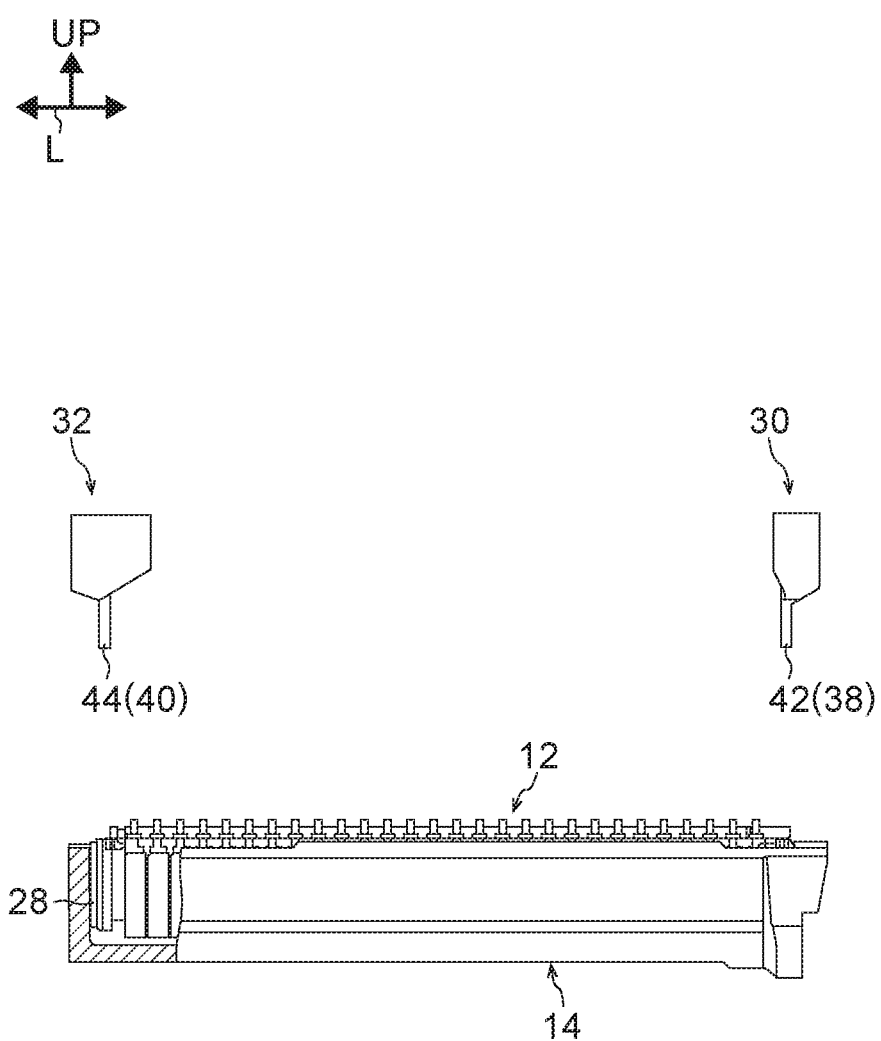
FIG. 19 is a side view corresponding to FIG. 18.

FIG. 18 is an exploded perspective view illustrating a state in which the gripping members 30, 32 have been withdrawn from the end plates 20, 21 of the battery stack 12, as viewed obliquely from the upper side. FIG. 19 is a side view corresponding to FIG. 18.

In the present exemplary embodiment, after the claw portion 38 of the gripping member 30 and the claw portion 40 of the gripping member 32 have been inserted into the respective grooves 29 of the end plates 20, 21, and the shim 28 has inserted between the housing case 14 and the battery stack 12 on the gripping member 32 side as illustrated in FIG. 10, FIG. 14, and FIG. 15, the gripping members 30, 32 are then withdrawn from the battery stack 12 as illustrated in FIG. 18 and FIG. 19.

Operation and Advantageous Effects of Battery Module

Next, explanation follows regarding operation and advantageous effects of the battery module 10 according to the present exemplary embodiment of the present disclosure, together with an explanation regarding manufacturing processes (a manufacturing method) to manufacture the battery module 10.

In outline, the battery module 10 according to the present exemplary embodiment is manufactured by sequentially performing a pressing process to press the battery stack 12, a length measuring process to measure the length of the battery stack 12, a battery stack insertion process to insert the battery stack 12 into the housing case 14, and a shim insertion process to insert the shim 28.

Battery Stack Pressing Process

During the pressing process of the battery stack 12 of the present exemplary embodiment, first, as illustrated in FIG. 4 and FIG. 5, the claw portions 38, 40 provided to the gripping members 30, 32 are respectively inserted into the plural grooves 29 formed in the outer faces 20A, 21A of the end plates 20, 21 provided to the two length direction end portions 12A, 12B of the battery stack 12.

The gripping member 32 is then brought closer to the gripping member 30, such that the battery stack 12 is pressed along the stacking direction of the battery cells 16 (arrow L direction) at a predetermined pressing force (F) through the claw portions 38, 40 of the gripping members 30, 32. The battery stack 12 is thereby compressed along the stacking direction of the battery cells 16.

Battery Stack Length Measuring Process

Figure 6:
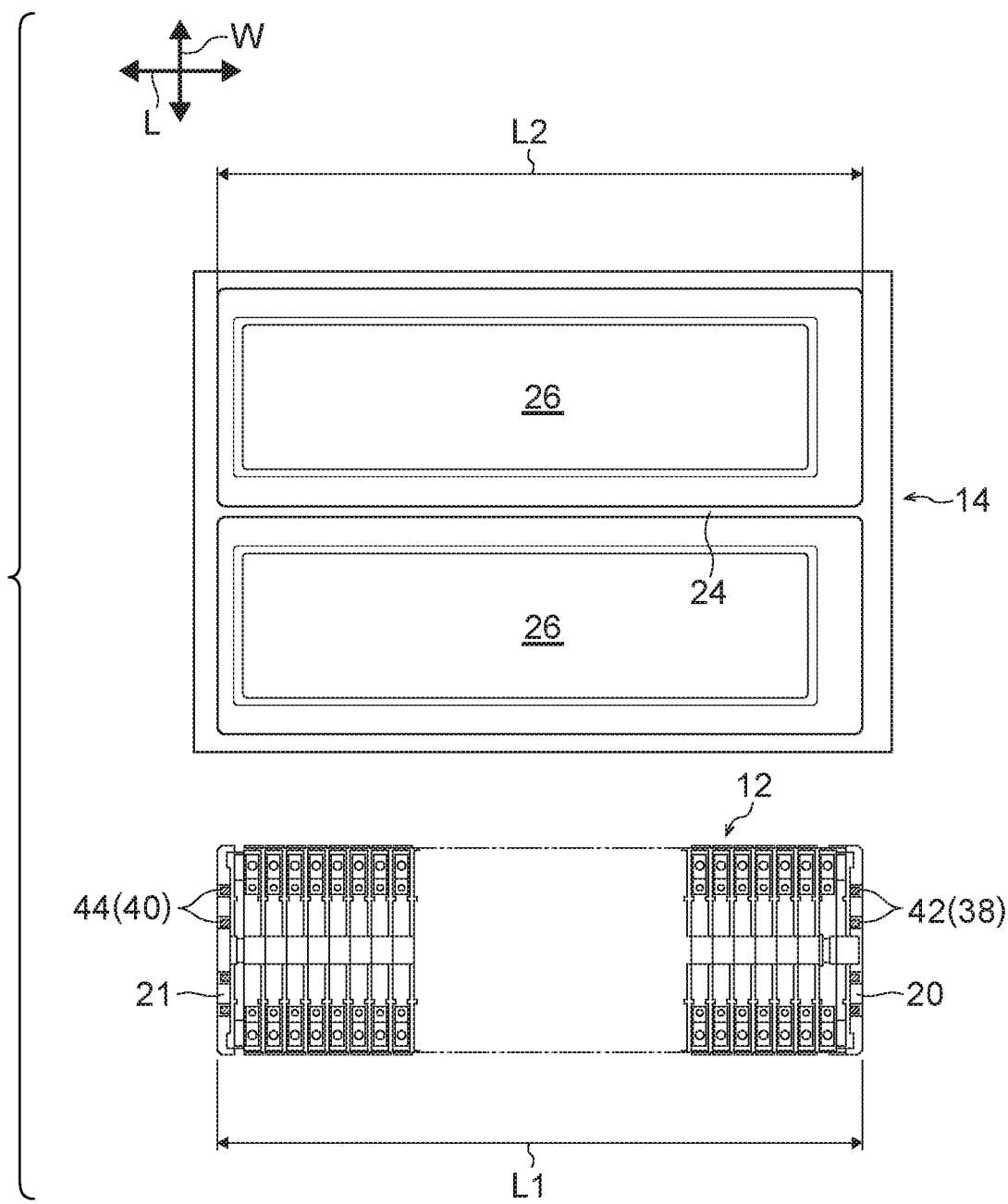
FIG. 6 is a plan view sectioned along line A-A in FIG. 5.

FIG. 5 is a side view illustrating a state in which the two length direction end portions 12A, 12B of the battery stack 12 are being gripped by the respective gripping members 30, 32. FIG. 6 is a plan view sectioned along line A-A in FIG. 5.

As illustrated in FIG. 6, in the length measuring process of the battery stack 12 of the present exemplary embodiment, a length direction length (L1) of the battery stack 12 and a length direction length (L2) of the housing sections 26 of the housing case 14 are measured.

Battery Stack Insertion Process

Figure 7:
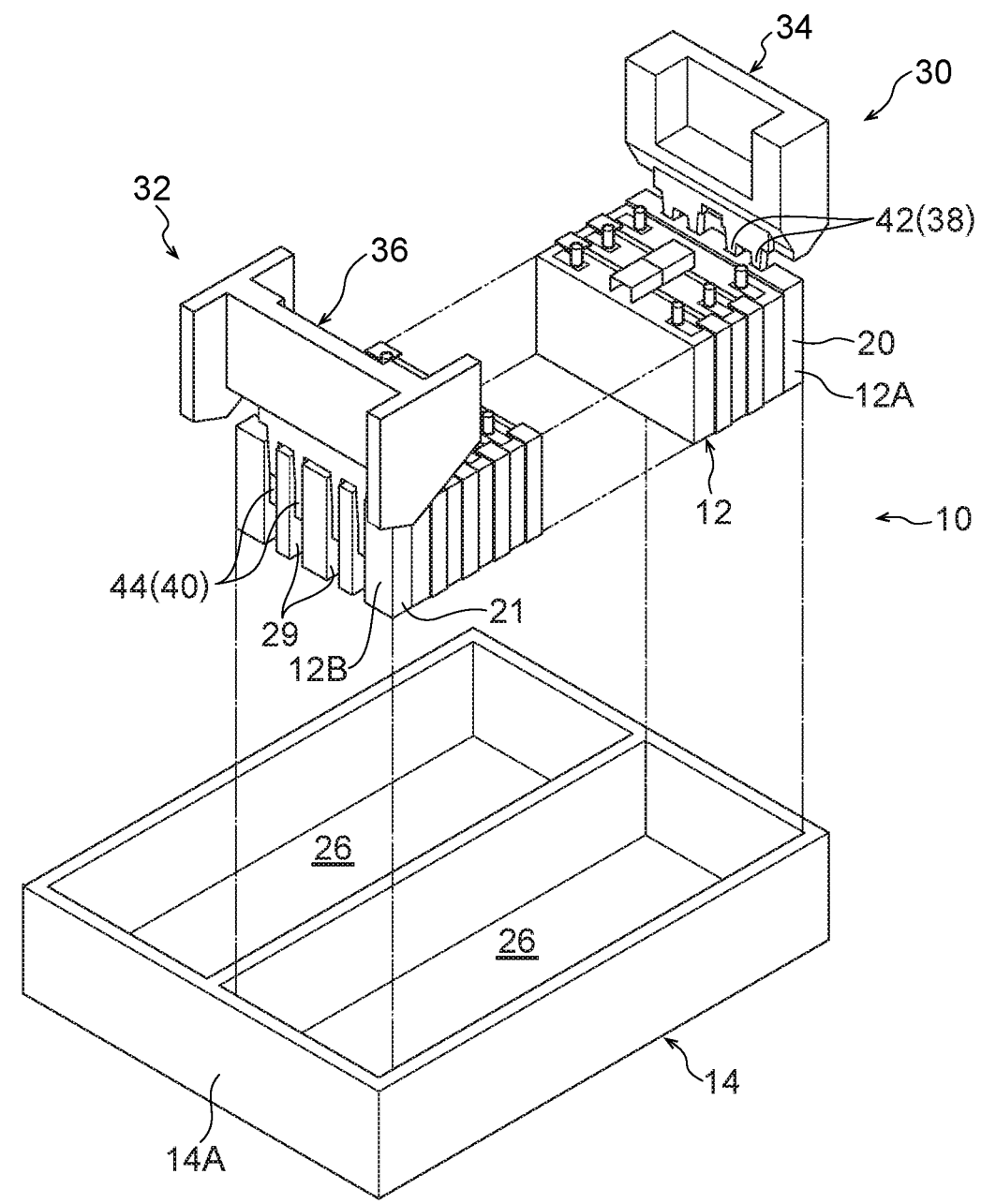
FIG. 7 is an exploded perspective view illustrating a state in which a battery stack configuring part of a battery module according to an exemplary embodiment is being inserted into a housing case, as viewed obliquely from the upper side.

FIG. 7 is an exploded perspective view illustrating a state in which the battery stack 12 is being inserted into the housing case 14, as viewed obliquely from the upper side.

In the insertion process of the battery stack 12 of the present exemplary embodiment, first, as illustrated in FIG. 7, the leg pieces 42 of the claw portion 38 and the leg pieces 44 of the claw portion 40 are respectively inserted into the plural grooves 29 formed in the end plates 20, 21 provided to the two length direction end portions 12A, 12B of the battery stack 12. Moreover, as illustrated in FIG. 8, the battery stack 12 is inserted into the housing case 14 in a state in which the battery stack 12 is being pressed along the stacking direction of the battery cells 16.

As illustrated in FIG. 1 and FIG. 14, in the present exemplary embodiment, the leading end sides of the leg pieces 42 of the gripping member 30 and the leg pieces 44 of the gripping member 32 are thinner than the respective base sides thereof, and the thickness t of the base sides is set smaller than the depth H of the respective grooves 29 formed in the end plates 20, 21 of the battery stack 12 (t<H).

Thus in the present exemplary embodiment, in a state in which the leg pieces 42 of the gripping member 30 and the leg pieces 44 of the gripping member 32 have been inserted into the respective grooves 29 of the end plates 20, 21, the outer face 20A of the end plate 20 and the outer face 21A of the end plate 21 project further outward than the outer faces 42A of the leg pieces 42 and the outer faces 44A of the leg pieces 44.

Namely, in the present exemplary embodiment, in the state in which the leg pieces 42 of the gripping member 30 and the leg pieces 44 of the gripping member 32 have been inserted into the respective grooves 29 of the end plates 20, 21, the outer faces 42A of the leg pieces 42 and the outer faces 44A of the leg pieces 44 do not project out beyond the outer face 20A of the end plate 20 and the outer face 21A of the end plate 21.

Thus, the present exemplary embodiment enables the battery stack 12 to be housed inside the housing case 14 as illustrated in FIG. 8 in the state in which the leg pieces 42 of the gripping member 30 and the leg pieces 44 of the gripping member 32 have been inserted into the respective grooves 29 of the end plates 20, 21 as illustrated in FIG. 7.

Shim Insertion Process

In the insertion process of the shim 28 of the present exemplary embodiment, first, in a state in which the claw portions 38, 40 of the gripping members 30, 32 have been inserted into the respective grooves 29 of the end plates 20, 21 of the battery stack 12 that is housed (inserted) inside the housing case 14 as illustrated in FIG. 8, the gripping member 32 is brought closer to the gripping member 30.

Namely, the battery stack 12 is again pressed along the stacking direction of the battery cells 16 (arrow L direction) at the predetermined pressing force through the claw portions 38, 40 of the gripping members 30, 32. Thus, as illustrated in FIG. 9, an insertion gap s is formed between the housing case 14 and the battery stack 12, enabling the shim 28 to be inserted (disposed) inside the insertion gap s.

Thus in the present exemplary embodiment, the gripping members 30, 32 that grip and press the battery stack 12 are employed to form the insertion gap s for the shim 28, thereby eliminating the need to provide a separate member for forming the insertion gap s.

Figure 11:
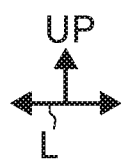
FIG. 11 is a side view corresponding to FIG. 10.
Figure 11:
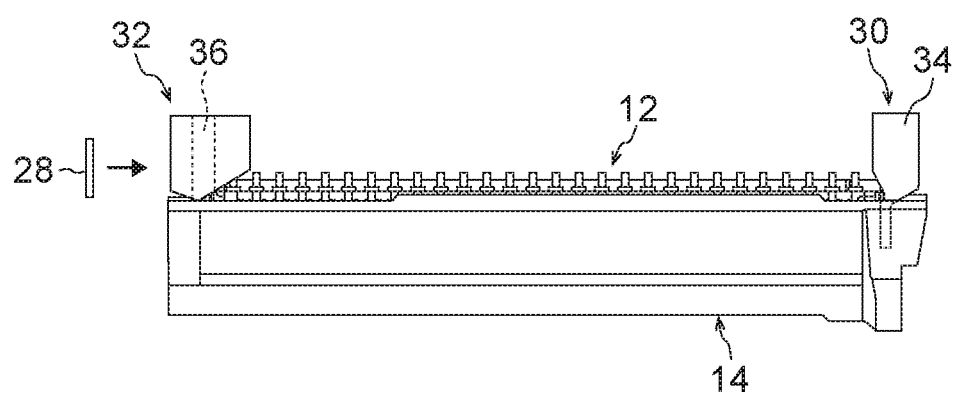
Figure 12:
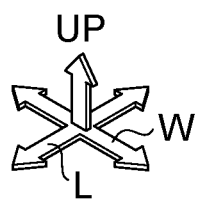
FIG. 12 is an enlarged perspective view of relevant portions in FIG. 10, with a state in which a shim is being inserted between a battery stack and a housing case configuring parts of a battery module according to an exemplary embodiment being illustrated by a double-dotted intermittent line.
Figure 12:
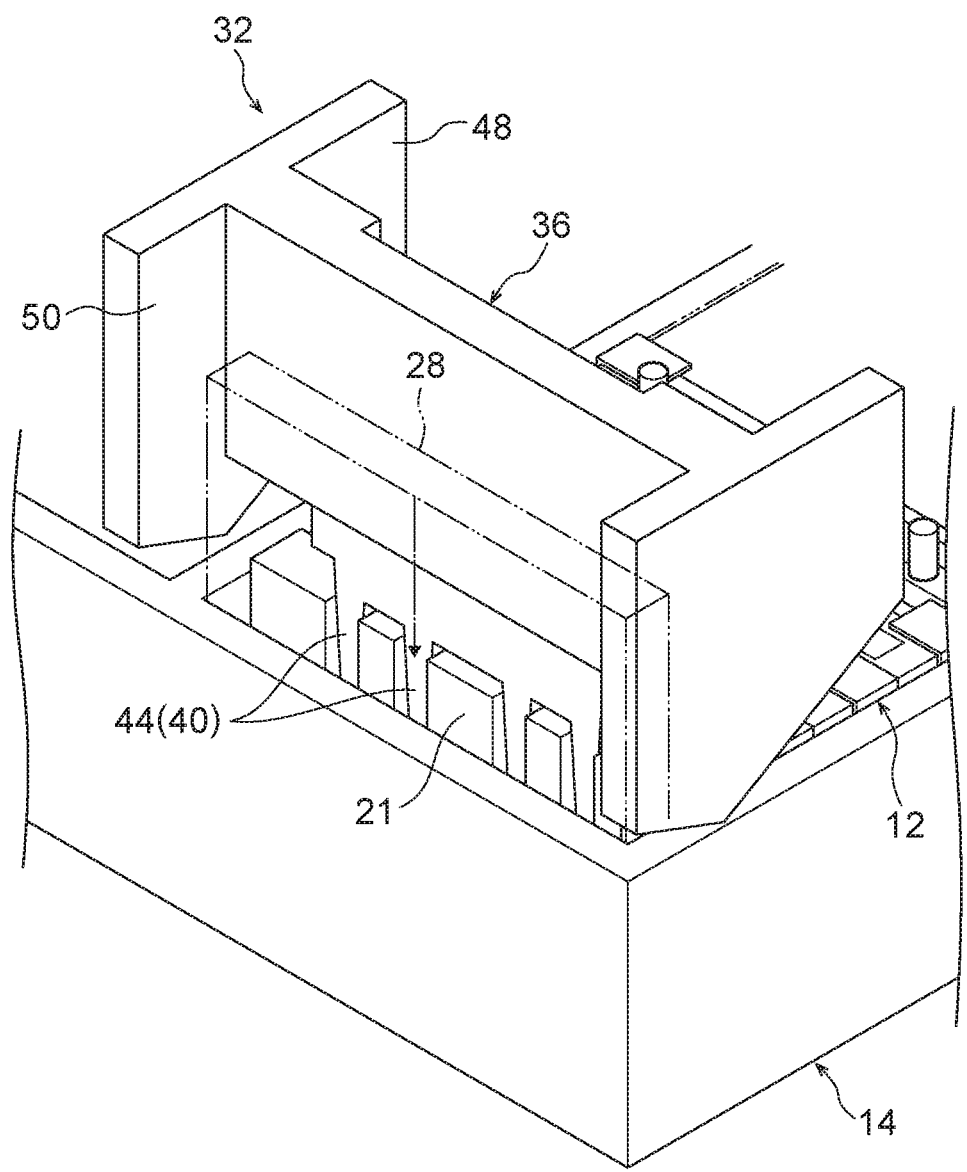
Figure 13:
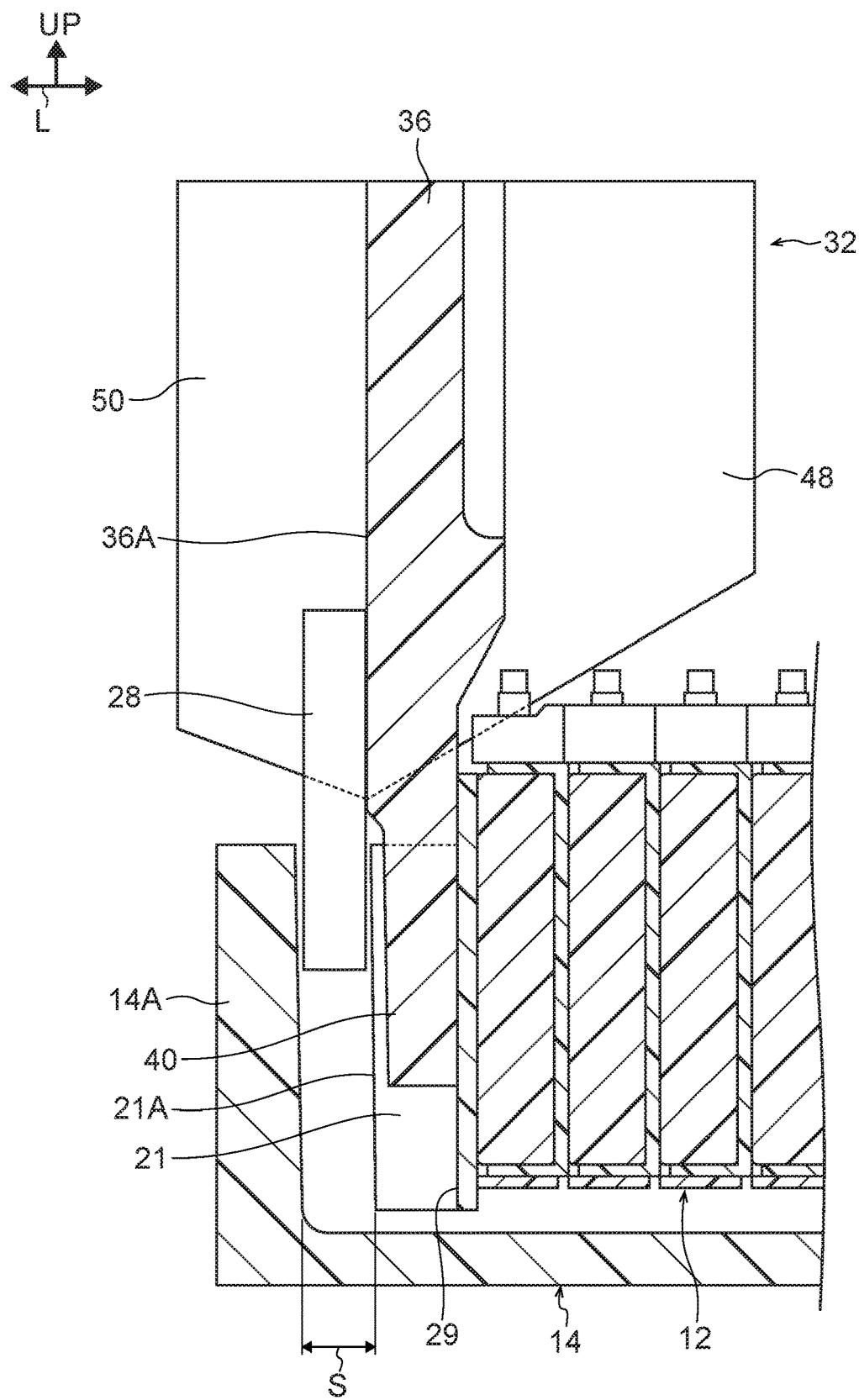
FIG. 13 is an enlarged cross-section of relevant portions in FIG. 10, illustrating a state in which a shim is being inserted between a battery stack and a housing case configuring parts of a battery module according to an exemplary embodiment.

As previously described, FIG. 10 is an exploded perspective view illustrating a state in which the shim 28 is being inserted between the battery stack 12 and the housing case 14, as viewed obliquely from the upper side. FIG. 11 is a side view corresponding to FIG. 10, and FIG. 12 is an enlarged exploded perspective view of relevant portions in FIG. 10, with a state in which the shim 28 is being inserted between the battery stack 12 and the housing case 14 along the base portion 36 of the gripping member 32 being illustrated by a double-dotted intermittent line. FIG. 13 is an enlarged cross-section of relevant portions in FIG. 10, illustrating a state in which the shim 28 is being inserted between the battery stack 12 and the housing case 14 along the base portion 36 of the gripping member 32.

In a state in which the insertion gap s has been formed between the housing case 14 and the battery stack 12 as illustrated in FIG. 9, in the present exemplary embodiment, the shim 28 is capable of abutting the lower portion of the base portion 36 as illustrated in FIG. 10 to FIG. 12, and is guided along the outer face 36A of the base portion 36 toward the lower side (the claw portion 40 side) between the opposing pair of outer side plates 50 of the base portion 36 as illustrated in FIG. 12 and FIG. 13.

In the present exemplary embodiment, in the state in which the claw portion 40 of the gripping member 32 has been inserted into the respective grooves 29 of the end plate 21 as illustrated in FIG. 9, the base portion 36 of the gripping member 32 is disposed at the upper side of the end plate 21. Furthermore, the outer face 36A of the base portion 36 is set so as to project further outward than the outer face 21A of the end plate 21.

In the present exemplary embodiment, the shim 28 is guided toward the lower side along the outer face 36A of the base portion 36 of the gripping member 32. Thus, when the shim 28 is moved toward the lower side along the outer face 36A of the base portion 36, the shim 28 moves from the base portion 36 of the gripping member 32 toward the claw portion 40 side.

Although not illustrated in the drawings, in the case of a comparative example in which the outer face 21A of the end plate 21 projects out beyond the outer face 36A of the base portion 36, the shim 28 might be impeded by an upper edge of the end plate 21 when the shim 28 is moved from the base portion 36 toward the claw portion 40 side.

Thus in the present exemplary embodiment, by setting the outer face 36A of the base portion 36 so as to project further outward than the outer face 21A of the end plate 21 as illustrated in FIG. 9, the shim 28 can be prevented from being impeded by the upper edge of the end plate 21 when the shim 28 is moved from the base portion 36 of the gripping member 32 toward the claw portion 40 side (lower side) as illustrated in FIG. 14.

This enables the shim 28 to be smoothly guided from the outer face 36A of the base portion 36 of the gripping member 32 toward the side of the outer face 21A of the end plate 21.

Figure 17:
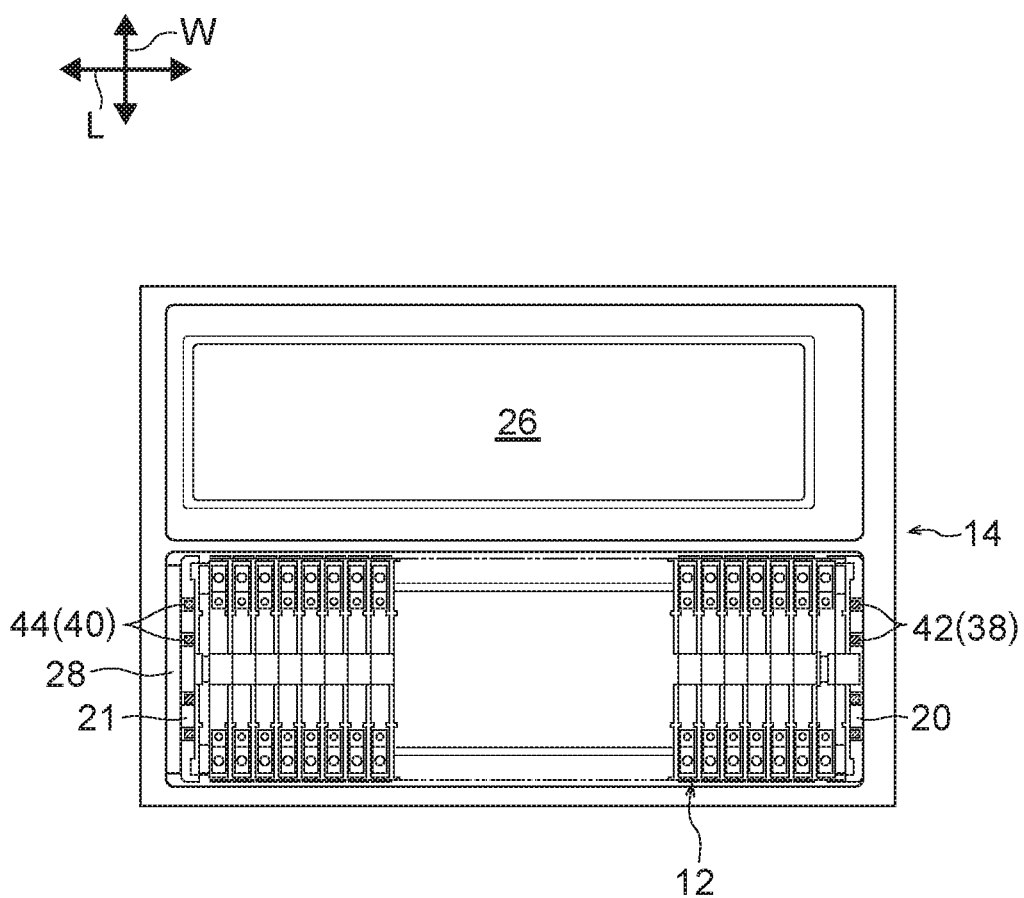
FIG. 17 is a plan view sectioned along line B-B in FIG. 16.

As illustrated in FIG. 15 and FIG. 17, due to disposing the shim 28 between the housing case 14 and the battery stack 12, the battery stack 12 is applied with a predetermined pressing force along the length direction of the battery stack 12.

Thus, the present exemplary embodiment enables both ease of insertion of the shim 28 during insertion of the shim 28 into the insertion gap s formed between the battery stack 12 and the housing case 14, and maintained pressing force pressing against the battery stack 12 in a state in which the battery stack 12 and the shim 28 have been housed inside the housing case 14, to be secured.

Thus in the present exemplary embodiment, the shim 28 is disposed between the battery stack 12 and the housing case 14, and the shim 28 maintains a state in which the battery stack 12 is pressed along the length direction of the battery stack 12. Namely, in the present exemplary embodiment, variation in the length direction dimension of the battery stack 12 can be absorbed by changing the plate thickness of the shim 28.

Thus in the present exemplary embodiment, even if manufacturing tolerances are present in the housing case 14 and the battery stack 12, providing the shim 28 between the battery stack 12 and the housing case 14 enables variation in the pressing force with which the battery stack 12 is pressed to be suppressed.

Figure 21:
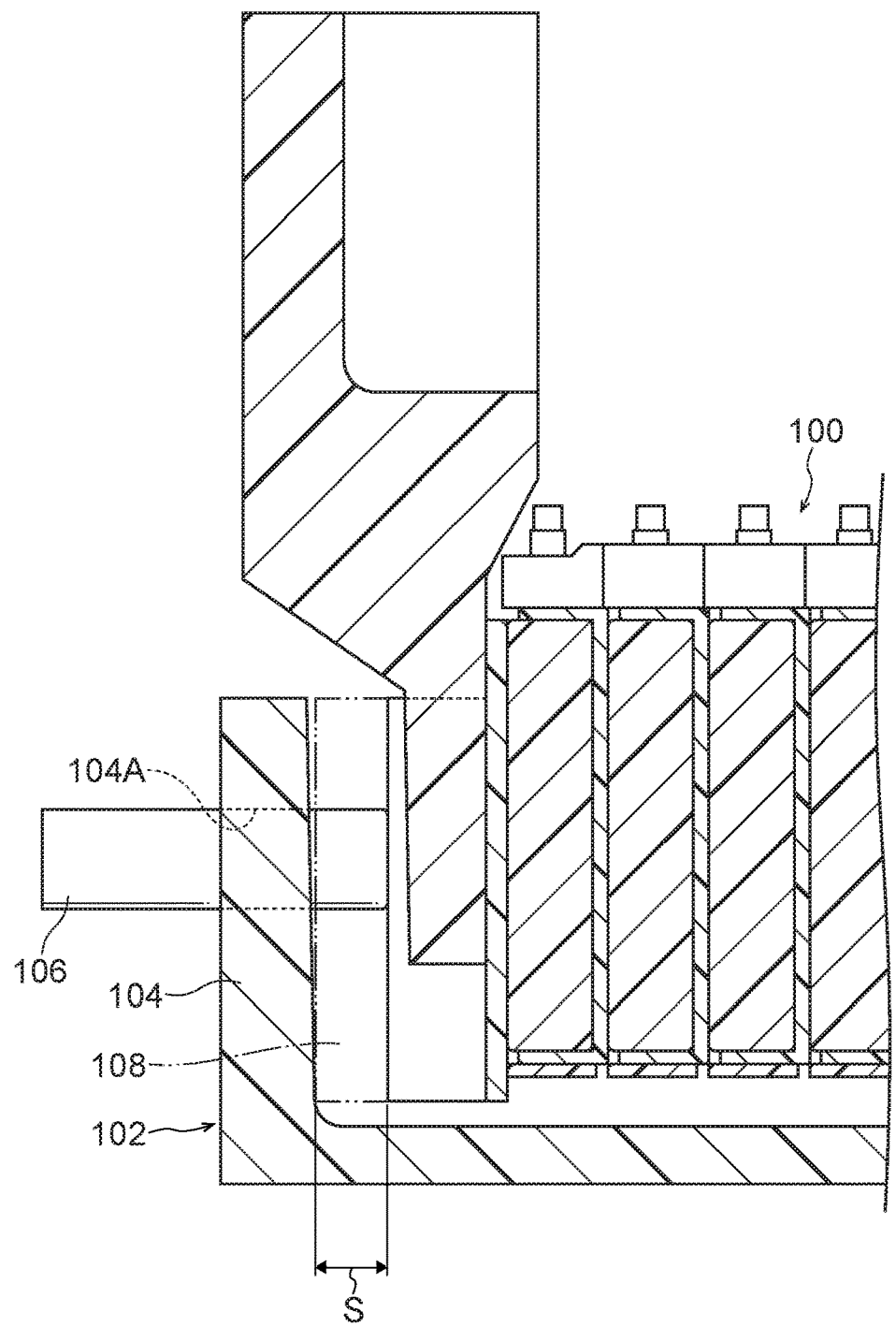
FIG. 21 is an enlarged cross-section corresponding to FIG. 13, illustrating relevant portions of a comparative example.

As illustrated in FIG. 21, as a comparative example, a method may be applied in which a hole 104A is formed in a side wall 104 of a housing case 102. In a state in which a battery stack 100 is housed inside the housing case 102, a press rod 106 is inserted inside the hole 104A, and the battery stack 100 is squeezed (compressed) along its length direction by the press rod 106 so as to form an insertion gap s between the housing case 102 and the battery stack 100.

In this method, the battery stack 100 is compressed in a state in which the battery stack 100 is housed inside the housing case 102, and so the hole 104A needs to be formed in the housing case 102 to allow insertion of the press rod 106.

In cases in which the hole 104A is formed in the housing case 102 in this manner, in order to secure waterproofness of the battery stack 100, the hole 104A needs to be blocked after a shim 108 has been inserted into the insertion gap s.

In contrast thereto, in the present exemplary embodiment, in a state in which the battery stack 12 and the gripping members 30, 32 have been housed inside the housing case 14 as illustrated in FIG. 8, the gripping member 32 is brought closer to the gripping member 30 in order to form the insertion gap s between the housing case 14 and the battery stack 12 as illustrated in FIG. 9.

Namely, the battery stack 12 is again pressed along the stacking direction of the battery cells 16 (arrow L direction) at the predetermined pressing force F (see FIG. 5) through the claw portions 38, 40 of the gripping members 30, 32. The insertion gap s is thereby formed between the housing case 14 and the battery stack 12, and the shim 28 is inserted (disposed) between the battery stack 12 and the housing case 14 as illustrated in FIG. 16 and FIG. 17.

Figure 16:
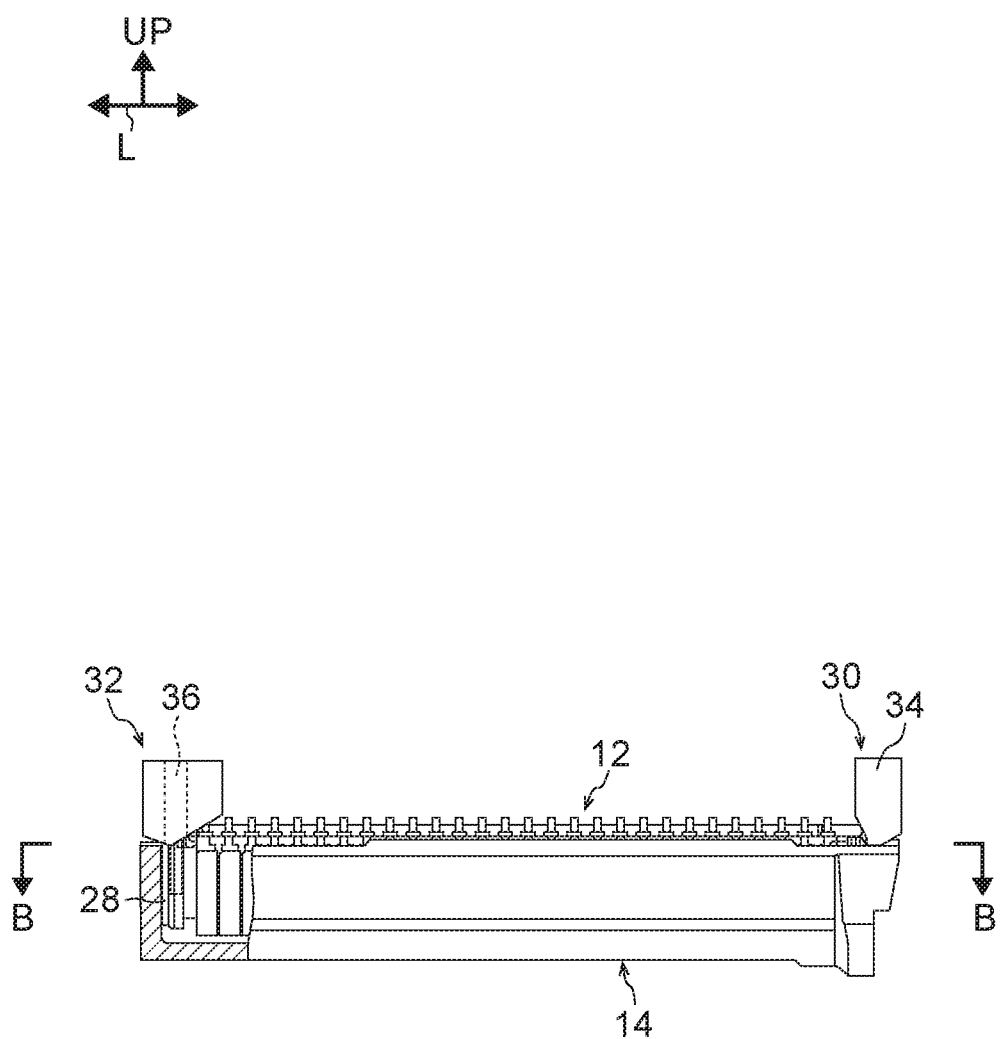
FIG. 16 is a side view illustrating a state in which a shim has been inserted between a battery stack and a housing case configuring parts of a battery module according to an exemplary embodiment.

FIG. 16 is a side view illustrating a state in which the shim 28 has been inserted between the battery stack 12 and the housing case 14, and FIG. 17 is a plan view sectioned along line B-B in FIG. 16.

As described above, there is no need to form a hole in the housing case 14 in the present exemplary embodiment. The housing case 14 as formed can thus obtain a waterproofing effect for the battery stack 12.

As illustrated in FIG. 21, in the comparative example the hole 104A needs to be formed in the housing case 102, thus necessitating a process to block the hole 104A in order to obtain a waterproofing effect. In contrast thereto, as illustrated in FIG. 10, such a hole is not formed in the housing case 14 in the present exemplary embodiment, and so a process to block such a hole is not required.

As illustrated in FIG. 21, when the hole 104A of the comparative example has been blocked, a blocked portion where the hole 104A has been blocked has a different rigidity than other locations. Thus, variation in the pressing force with which the battery stack 100 is pressed might arise between the blocked portion and the other locations.

In contrast thereto, as illustrated in FIG. 18, since such a hole is not formed in the housing case 14 in the present exemplary embodiment, such variation in the pressing force against the battery stack 12 as a result of forming a hole does not arise. Thus, the present exemplary embodiment enables variation in the pressing force with which the battery stack 12 is pressed to be suppressed.

In the present exemplary embodiment, after the shim 28 has been inserted between the housing case 14 and the battery stack 12 as illustrated in FIG. 15 to FIG. 17, the gripping members 30, 32 are withdrawn from the battery stack 12 as illustrated in FIG. 18 and FIG. 19.

In the present exemplary embodiment, in a state in which the leg pieces 42 of the claw portion 38 of the gripping member 30 and the leg pieces 44 of the claw portion 40 of the gripping member 32 have been inserted into the respective grooves 29 of the end plates 20, 21 as illustrated in FIG. 13 and FIG. 14, the outer face 20A of the end plate 20 and the outer face 21A of the end plate 21 project further outward than the outer faces 42A of the leg pieces 42 and the outer faces 44A of the leg pieces 44.

Thus in the present exemplary embodiment, in the state in which the battery stack 12 is housed inside the housing case 14, as illustrated in FIG. 18 and FIG. 19, the leg pieces 42 of the gripping member 30 and the leg pieces 44 of the gripping member 32 can be withdrawn from inside the respective grooves 29 without being impeded by the housing case 14.

Moreover, as described later, in the present exemplary embodiment, in the state in which the battery stack 12 is housed inside the housing case 14, as illustrated in FIG. 18 and FIG. 19, the leg pieces 42 of the gripping member 30 and the leg pieces 44 of the gripping member 32 can be withdrawn from inside the respective grooves 29 without being impeded by the housing case 14.

Although an example of an exemplary embodiment of the present disclosure has been given above, various modifications to the present disclosure may be implemented within a range not departing from the spirit of the present disclosure. Obviously the scope of rights of the present disclosure is not limited by the above exemplary embodiment.

What is claimed is:

1. A battery module manufacturing method for application to manufacture of a battery module having a box-shaped housing case that is open at an upper side and that does not include a hole formed in a side wall, a battery stack that includes a plurality of battery cells stacked along a horizontal direction and that is housed inside the housing case, and a shim that is disposed between the battery stack and the housing case, the battery module manufacturing method comprising:

a pressing process of pressing the battery stack along the battery cell stacking direction using a gripping member for gripping two battery cell stacking direction end portions of the battery stack;

a battery stack insertion process of inserting the battery stack that has been pressed in the pressing process into the housing case together with the gripping member; and a shim insertion process of inserting the shim between the battery stack and the housing case along the gripping member that has been inserted into the housing case during the battery stack insertion process, wherein the gripping member includes:

a plate-shaped base portion having an inner face and an outer face opposite to the inner face, the plate-shaped base portion configured to apply a pressing force to press the battery stack and configured to guide the shim toward a lower side;

a claw portion that extends downward from the base portion and grips the corresponding battery cell stacking direction end portion;

an inner side plate that extends along the battery cell stacking direction from the inner face of the base portion, and that is disposed at a side of the battery stack in a state in which the claw portion is gripping the corresponding battery cell stacking direction end portion; and an opposing pair of outer side plates that extends along the battery cell stacking direction from the outer face of the base portion, the opposing pair of outer side plates respectively positioned at two width direction end portions of the base portion.

2. The battery module manufacturing method of claim 1, wherein:

a groove is provided at an end plate at each of two battery cell stacking direction ends of the battery stack, the groove being formed from an upper edge of the end plate so as to run along a vertical direction at an outer face of the end plate;

the base portion is oriented such that a face from which the outer side plate extends is an outer face capable of guiding the shim toward the lower side along the outer face; and the base portion is set such that, in a state in which the claw portion has been inserted into the groove, the base portion is disposed at an upper side of the end plate and the outer face of the base portion projects further outward than the outer face of the end plate.

* * * * *